Sept. 25, 1928.

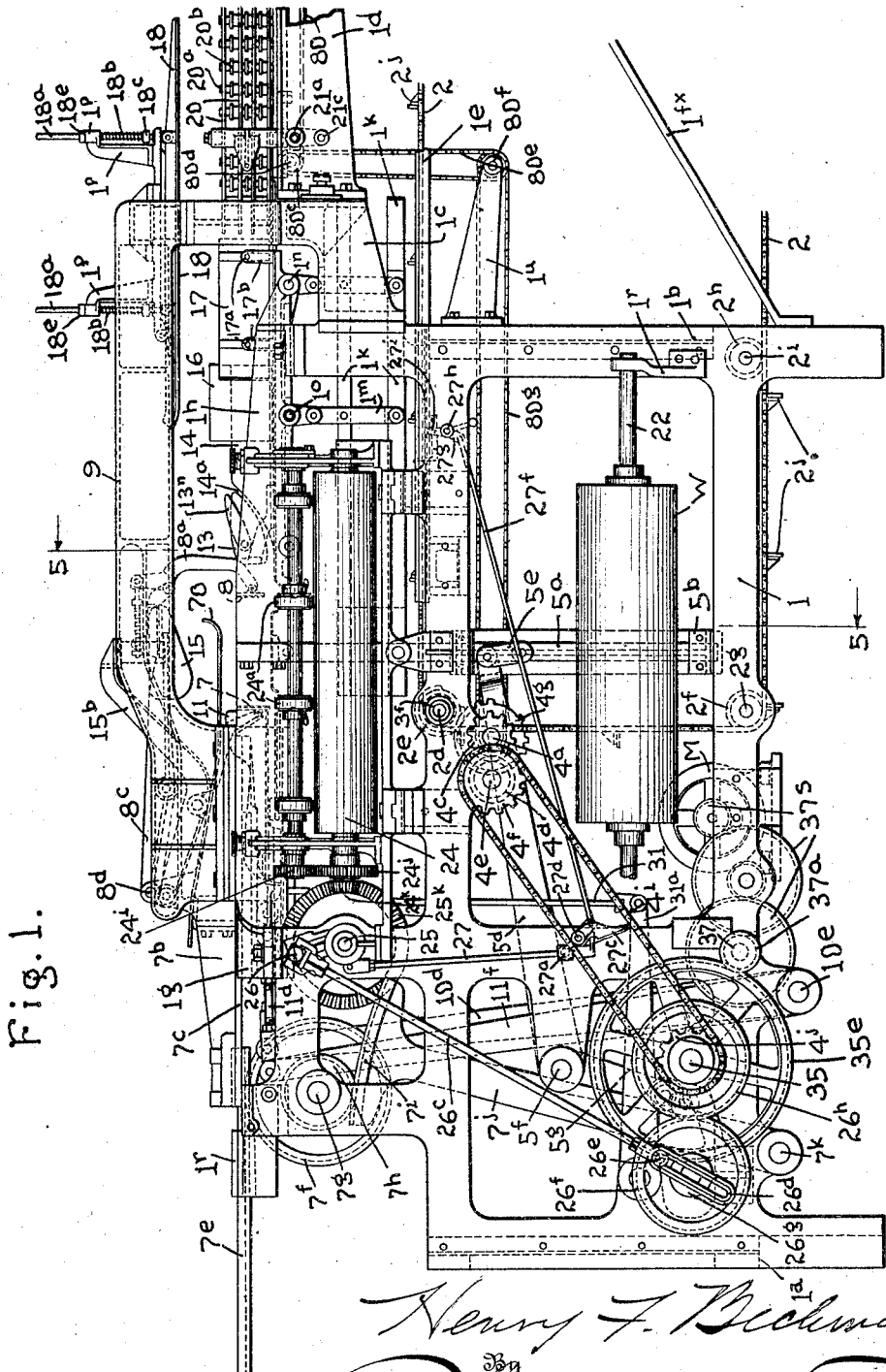

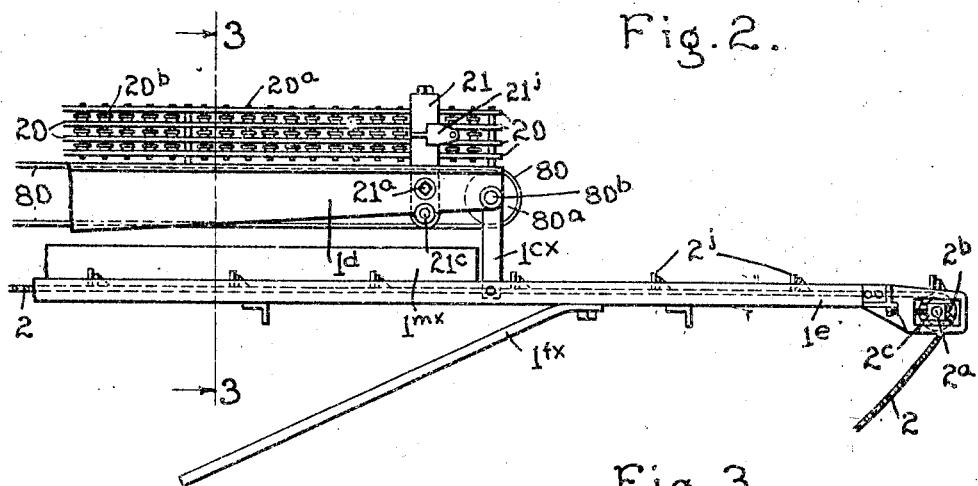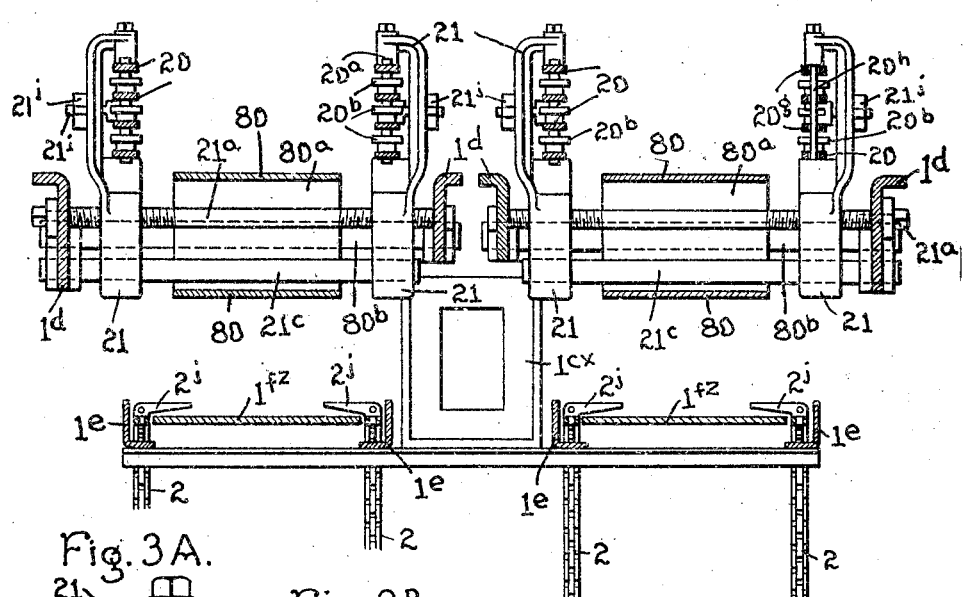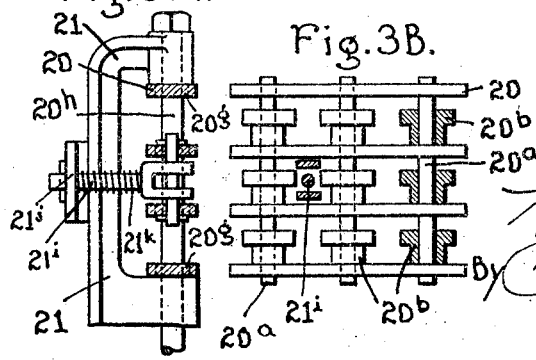

H. F. BECHMAN 1,685,146

BREAD WRAPPING MACHINE

Filed Feb. 6, 1923

H. F. BECHMAN

BREAD WRAPPING MACHINE

Filed Feb. 6, 1923

Henry F. Bechman
By Alexander Lowell
Attorneys

Sept. 25, 1928.

H. F. BECHMAN

BREAD WRAPPING MACHINE

Filed Feb. 6, 1923

Henry F. Bechman
By Alexander Powell
Attorneys

Sept. 25, 1928.
H. F. BECHMAN
BREAD WRAPPING MACHINE
Filed Feb. 6, 1923
1,685,146
13 Sheets-Sheet 6
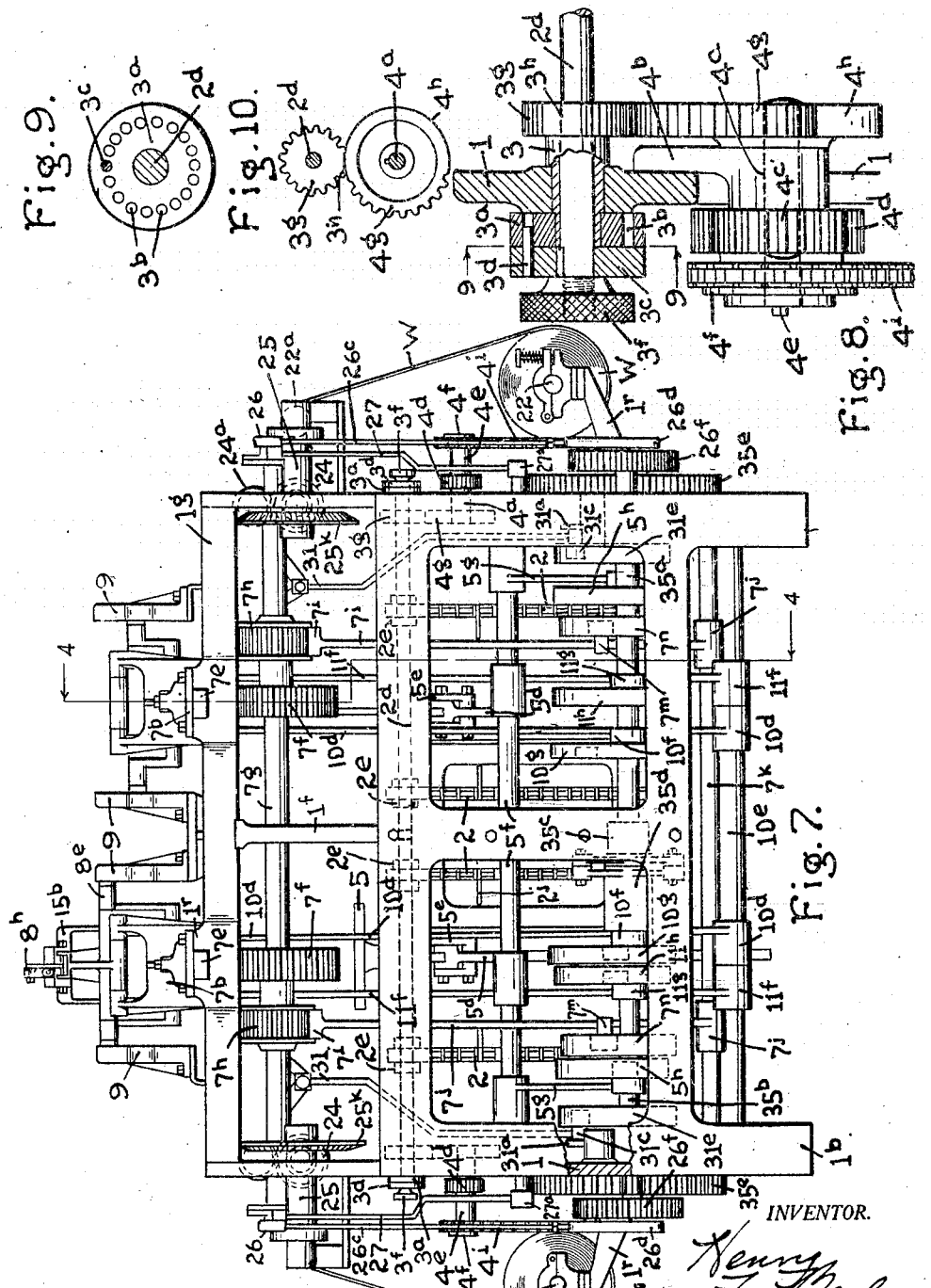
INVENTOR.
Henry F. Bechman
ATTORNEYS.

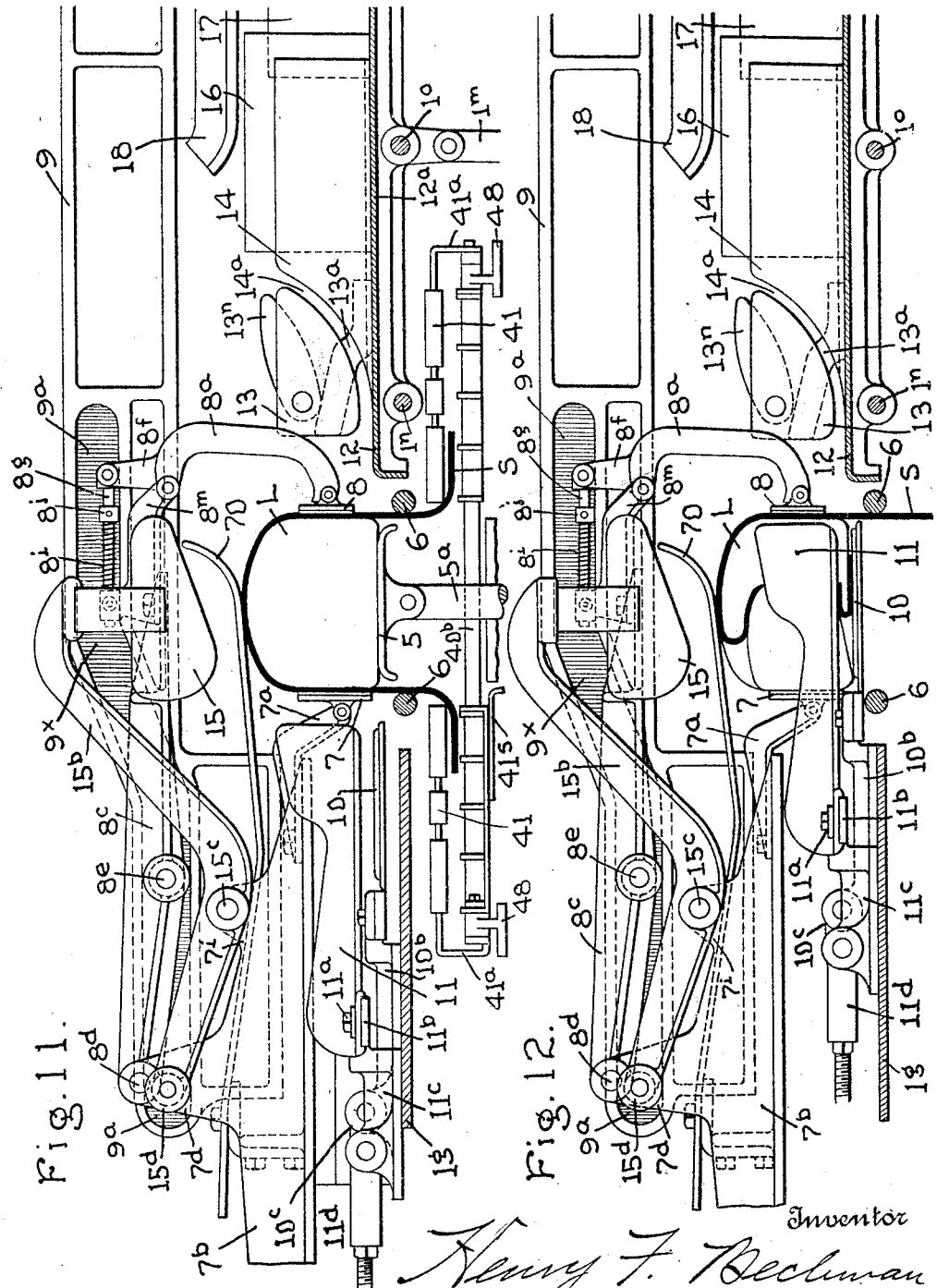

Sept. 25, 1928.
H. F. BECHMAN
1,685,146
BREAD WRAPPING MACHINE
Filed Feb. 6, 1923 13 Sheets-Sheet 8
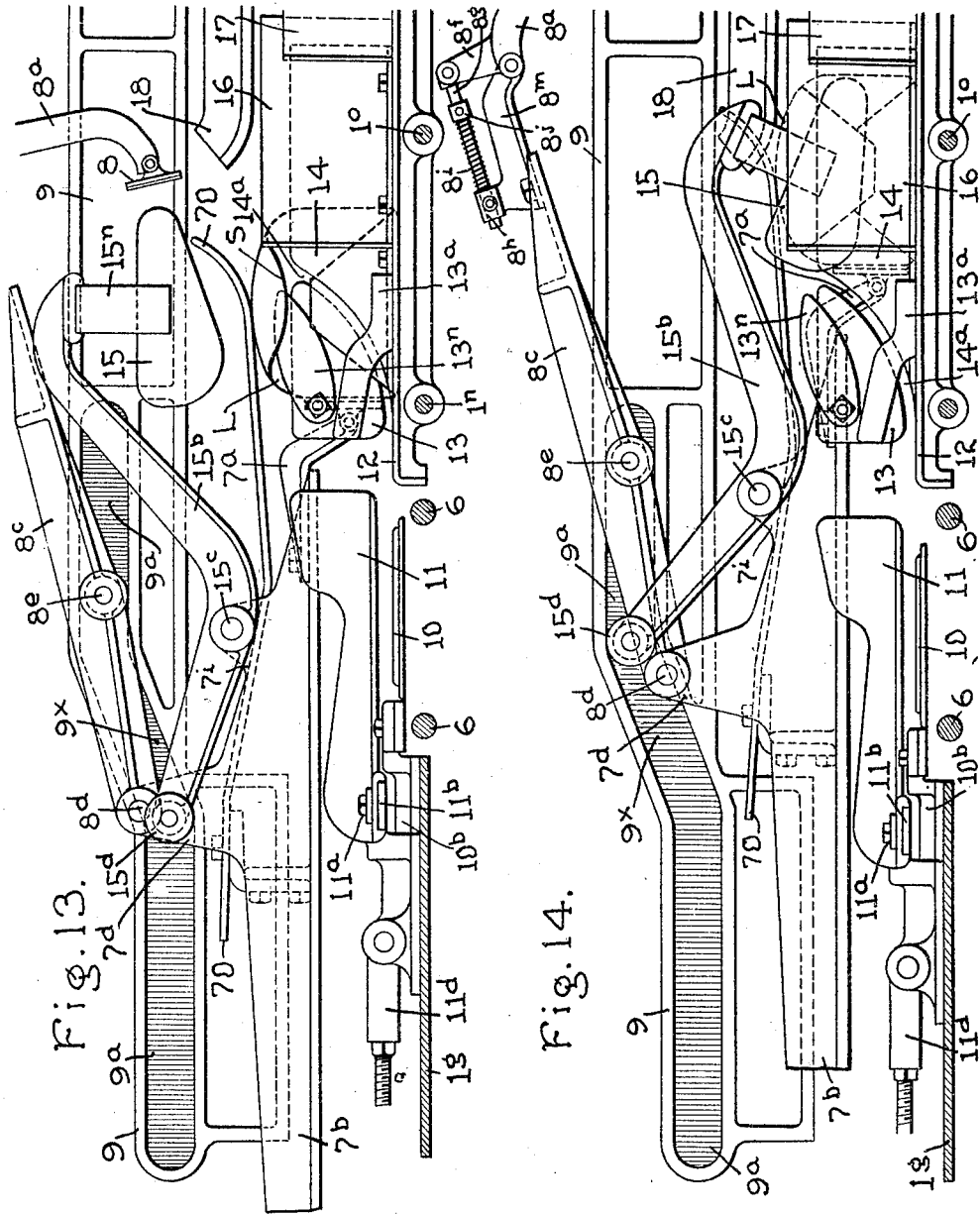

Sept. 25, 1928.
H. F. BECHMAN
1,685,146
BREAD WRAPPING MACHINE
Filed Feb. 6, 1923    13 Sheets-Sheet 9
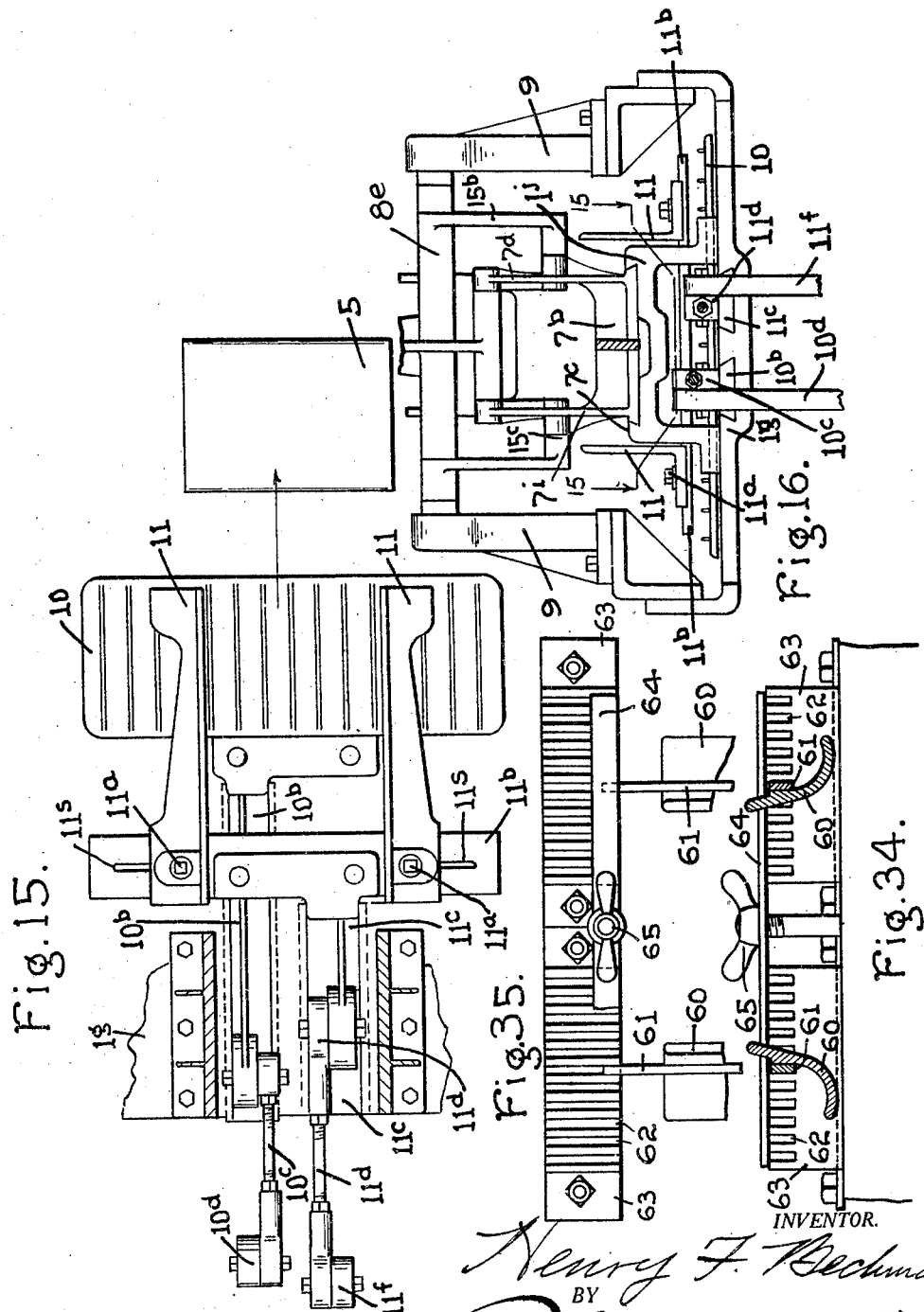
INVENTOR.
Henry F. Bechman
BY
Alexander Lowell
ATTORNEYS

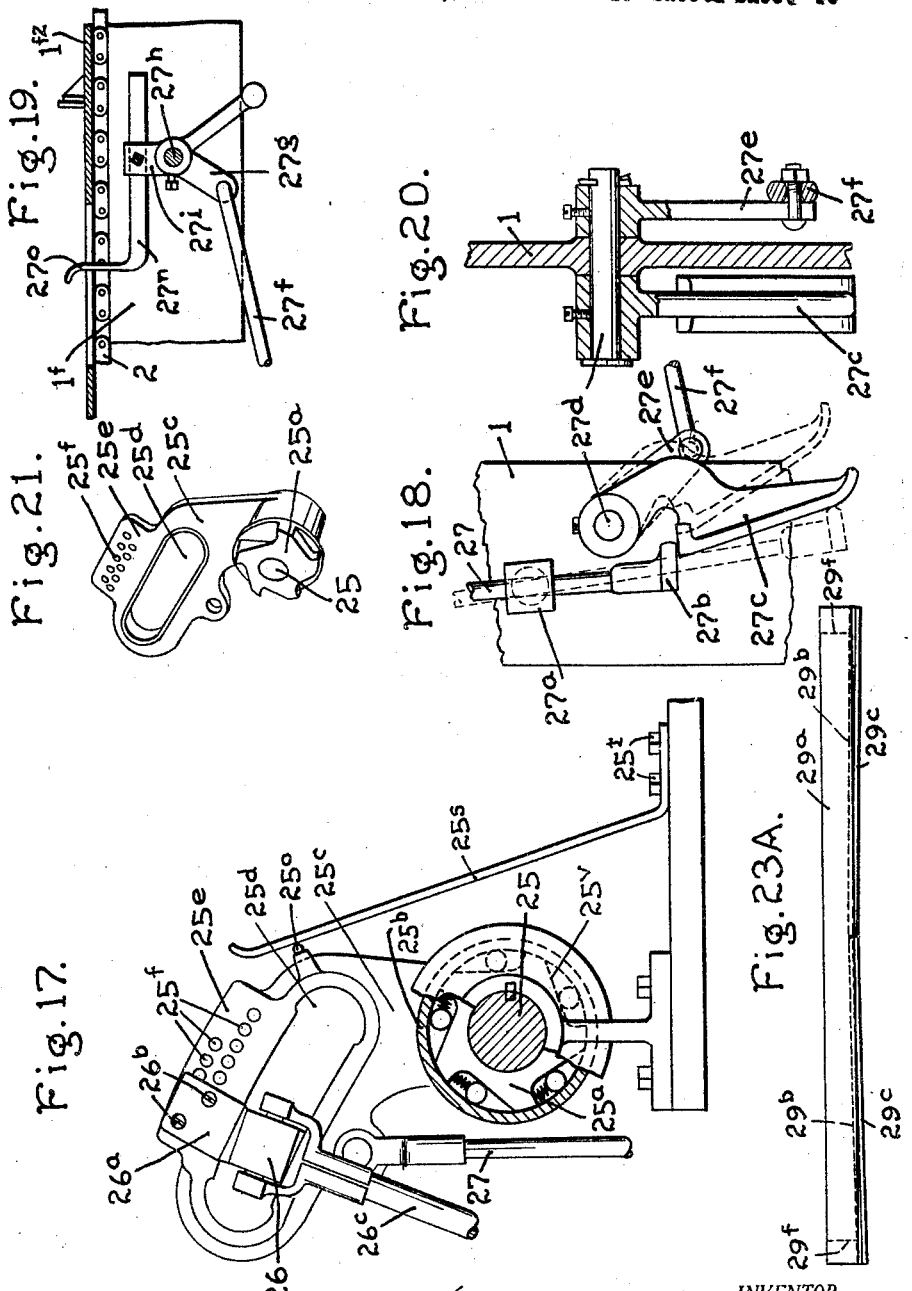

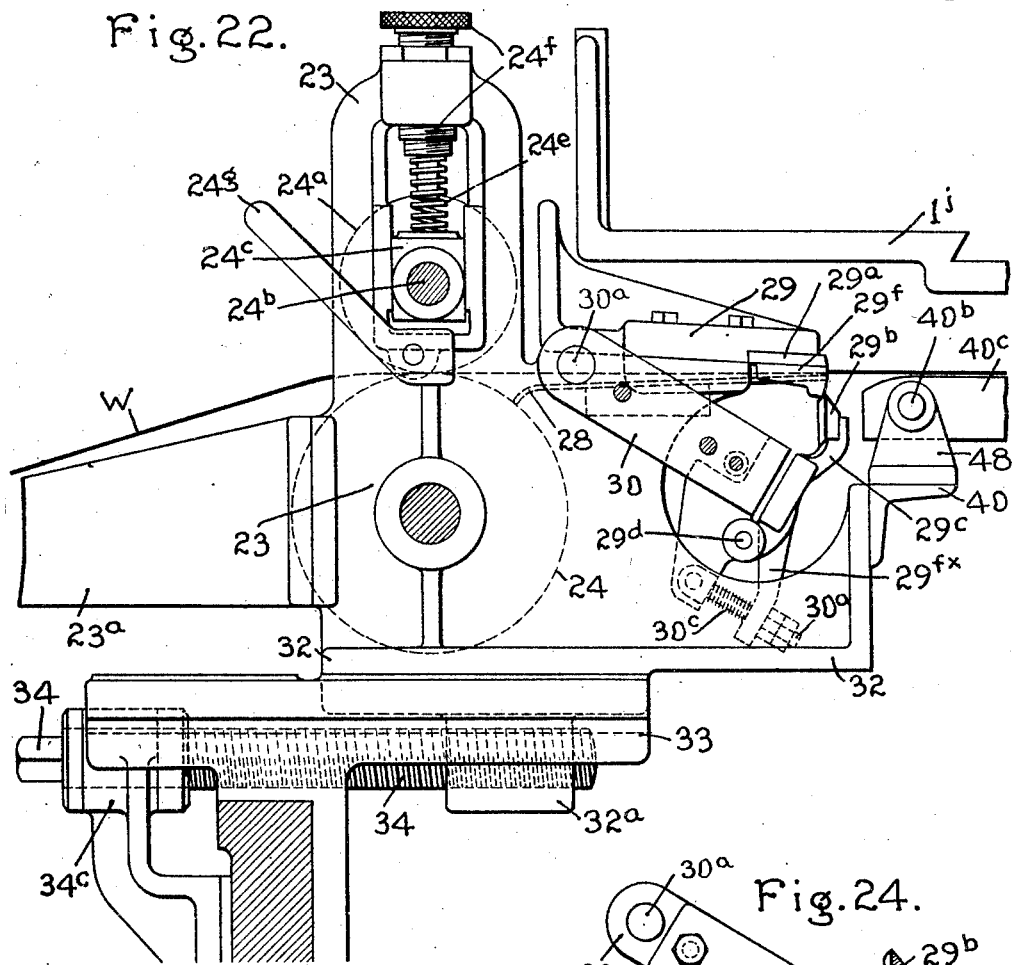

Sept. 25, 1928.
H. F. BECHMAN
BREAD WRAPPING MACHINE
Filed Feb. 6, 1923
1,685,146
13 Sheets-Sheet 12
Fig. 25.
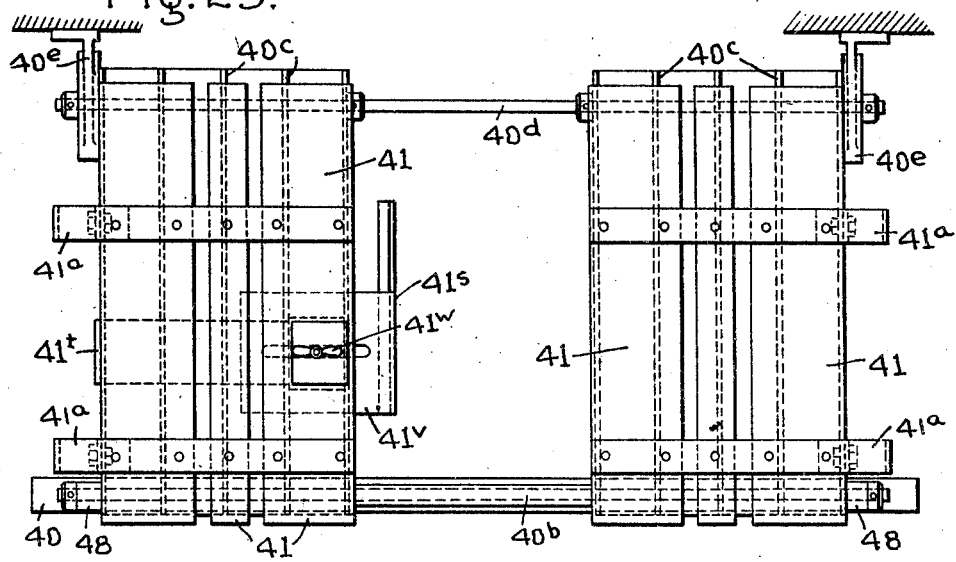
Fig. 26.
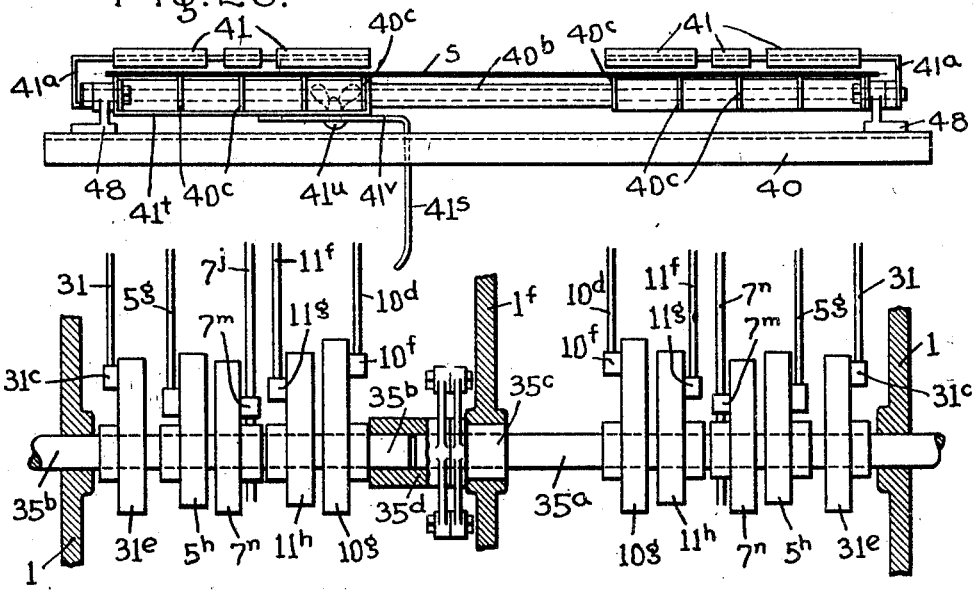
Fig. 27.
Inventor
Henry F. Bechman
By Alexander & Dowell
Attorneys.

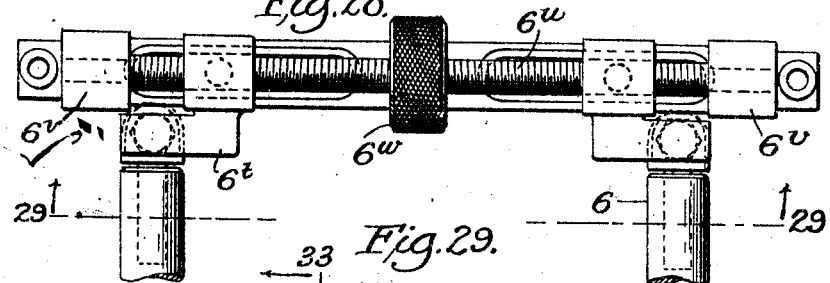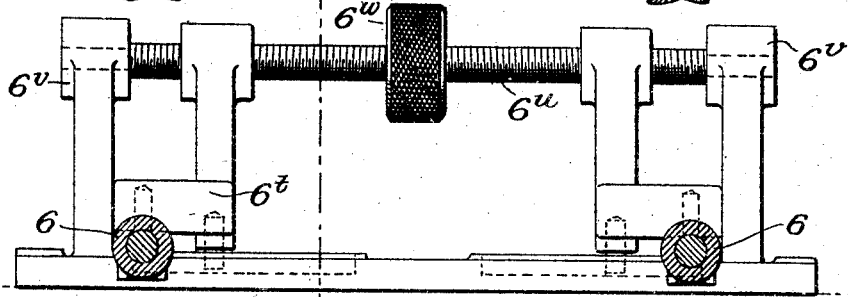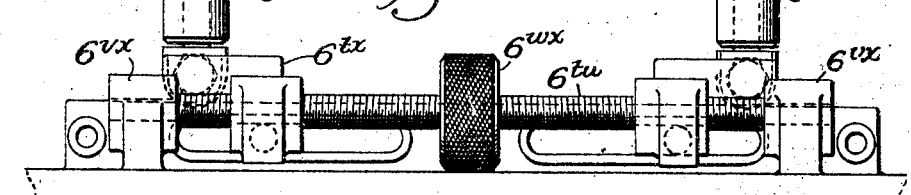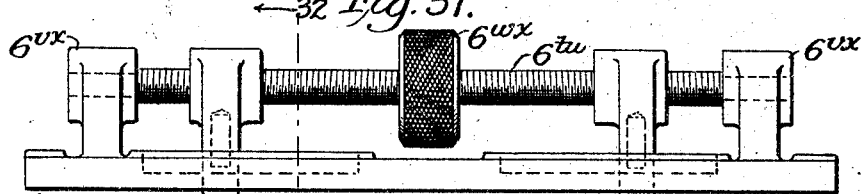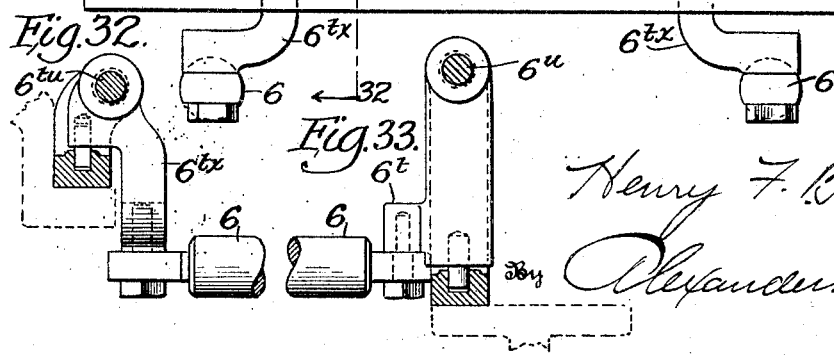

Patented Sept. 25, 1928.

1,685,146

UNITED STATES PATENT OFFICE.

HENRY F. BECHMAN, OF BATTLE CREEK, MICHIGAN, ASSIGNOR TO BATTLE CREEK BREAD WRAPPING MACHINE COMPANY, OF BATTLE CREEK, MICHIGAN.

BREAD-WRAPPING MACHINE.

Application filed February 6, 1923. Serial No. 617,209.

This invention relates to machines for wrapping objects, such as loaves of bread, or other formed articles, or cartons containing articles of various descriptions, and for sealing same if desired.

The invention includes means for feeding the objects to be wrapped to the wrapping mechanism; mechanism for feeding sheets of paper to the wrapping mechanism; mechanism whereby the sheet of paper is first wrapped around the object, and then the ends of the wrapper folded; means for sealing the folds of the wrapper if desired; and means for discharging the completely wrapped object from the machine. The invention further includes means whereby a plurality of objects may be simultaneously operated upon and wrapped; and also means whereby objects of different sizes may be simultaneously operated upon.

To enable others to fully understand and use the invention I will explain the same as embodied in a machine especially adapted for wrapping loaves of bread or like objects; such machine being illustrated in the accompanying drawings which form part of the specification. In the claims following the description I have summarized the essentials of the invention, and the novel combinations of parts, and novel details of construction, for all of which protection is desired.

In the following description and claims I will refer to the object or objects being wrapped as a "loaf" or "loaves", but it should be understood that the words "loaf" or "loaves" are merely descriptive and not definitive, and by such words I intend to include not only loaves of bread, and the like, but also all hard or reasonably firm and properly uniformly shaped objects of any material, or practically uniform packages, bundles, or cartons, of material, which it may be desired to wrap; as it will be obvious to those skilled in the art that the invention is not limited to merely wrapping of loaves of bread, or the like.

In said drawings:

Fig. 1 is a side elevation of the machine, part of the delivery being broken away, and various parts being broken away or omitted to prevent confusion.

Fig. 2 is a view of the discharge end of the delivery mechanism, and forms a continuation or completion of the right hand end of Fig. 1.

Fig. 3 is an enlarged detail transverse section on the line 3—3 Fig. 2.

Figs. 3ª and 3ᵇ are fragmentary details of the delivery mechanism illustrated in Figs. 2 and 3.

Fig. 4 is an enlarged longitudinal section through Fig. 1.

Figure 5:
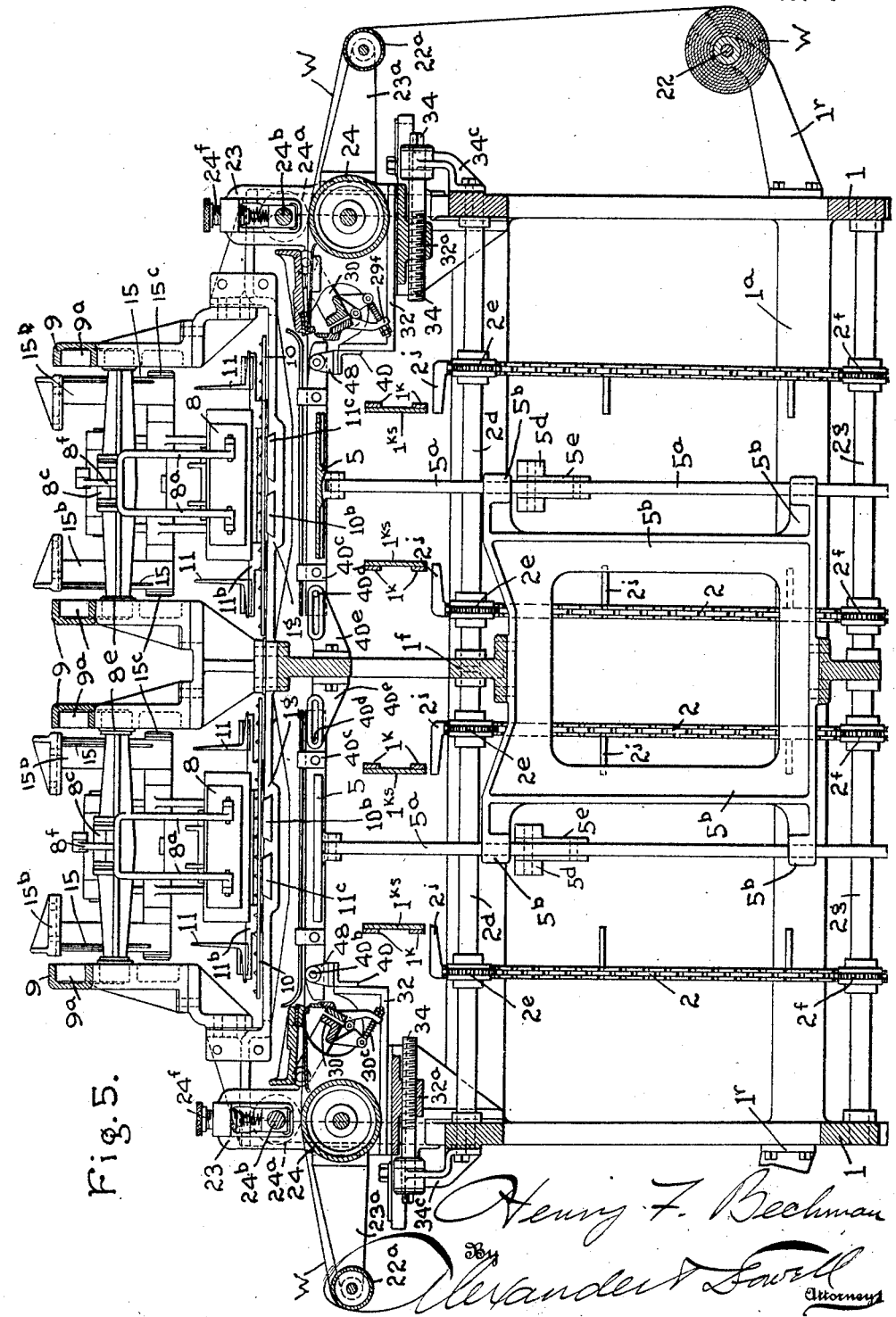

Fig. 5 is a transverse section on the line 5—5 Fig. 1.

Figure 6:
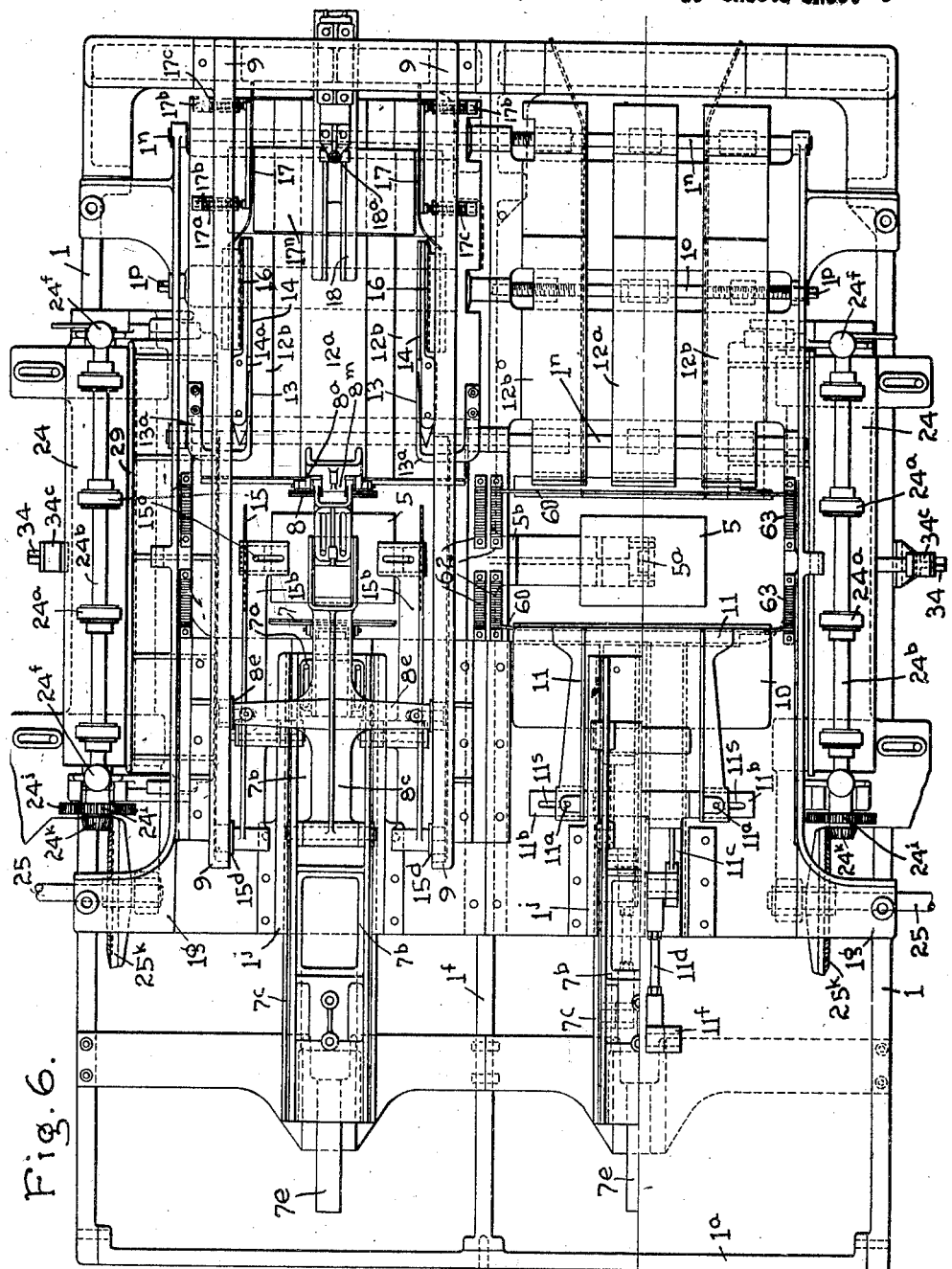

Fig. 6 is a top plan view of the machine, some parts being omitted for the sake of clearness, and the extended parts of the feed and delivery mechanisms being also omitted.

Fig. 7 is a slightly reduced rear end elevation of Fig. 1.

Fig. 8 is an enlarged detail view of the adjustable mechanism for driving the feed chains.

Fig. 9 is a detail sectional view on the line 9—9 Fig. 8.

Fig. 10 is a detail face view of the intermittent gears 3ᵍ and 4ᵍ.

Figs. 11, 12, 13, and 14 are enlarged detail views illustrating the different successive steps of wrapping a loaf, and the different positions assumed by the movable folding devices during such wrapping of a loaf.

Fig. 15 is a detail top plan view of the devices for folding the first bottom flap, and devices for making the first end folds.

Fig. 16 is an enlarged detail view showing the relative arrangement of the several slides which carry the various reciprocating tucking devices and loaf holders.

Fig. 17 is an enlarged detail view of the adjustable paper feed devices.

Fig. 18 is a detail view showing part of the paper feed trip device.

Fig. 19 is a detail view of the loaf-actuated paper feed trip device.

Fig. 20 is a detail view partly in section of the device shown in Fig. 18.

Fig. 21 is a perspective view of the arm 25ᶜ shown in Fig. 17.

Fig. 22 is an enlarged detail end elevation of the paper feed mechanism detached.

Fig. 23 is a reduced front view of the paper cutting devices.

Fig. 23ᵃ is a diagrammatical top plan view of the cutter bar and cutting knives.

Fig. 24 is a detail of part of the paper cutting devices.

Fig. 25 is a top plan view of the means for supporting an infed sheet above the loaf.

Fig. 26 is a side view of Fig. 25.

Fig. 27 is a detail view of the cam shaft assembly.

Fig. 28 is an enlarged detail view of the devices for supporting the inner ends of the bars 6.

Fig. 29 is a side view of Fig. 28.

Fig. 30 is a plan view of the device for supporting the outer ends of the bars 6.

Fig. 31 is a side elevation of Fig. 30.

Fig. 32 is a detail section on the line 32—32 Fig. 31.

Fig. 33 is a detail section on the line 33—33 Fig. 29.

Fig. 34 (Sheet 9) is an enlarged detail sectional view of one form of adjustable loaf guides.

Fig. 35 is a plan view of Fig. 34.

The machine shown in the drawings is adapted to simultaneously wrap two "loaves" separately for each cycle of operation of the machine. The mechanisms by which the loaves are wrapped are substantially duplicated on each side of the machine, and the machine is so constructed that either side may be operated independently, or both sides simultaneously, means for such operation being provided by a single cam shaft of novel design and construction hereinafter described. The folding mechanisms are independently adjustable so that loaves of the same size, or loaves of different size, may be wrapped on opposite sides of the machine.

A description of the method of and means for feeding, wrapping and delivering one loaf will be explained, and, as similar parts are similarly lettered in the drawings, the description of one will enable both to be readily understood; the connecting and operating parts being hereinafter described. To facilitate an understanding of the mechanisms I will explain the same in relation to the several operations as they occur, beginning with the placing of the unwrapped "loaf" into the machine, and following same through the various folding and sealing devices to the final delivery of the completely wrapped and sealed "loaf".

In general.

In the particular embodiment of the invention shown in the accompanying drawings all the operative parts of the machine are mounted in framing suitably constructed to support the same. As shown in Figs. 1 to 7, this framing includes outer side frame castings 1, a center frame casting 1ᶠ, parallel with the side castings, end castings 1ᵃ and 1ᵇ, bracket castings 1ᶜ attached to the front end of the framing, and bracket arms 1ᵈ attached to the outer ends of brackets 1ᶜ, and projecting therefrom a sufficient distance to support the outer portions of the endless conveyor chain supporting table, and also supporting the devices upon which the wrapped and sealed packages are carried away from the wrapping and sealing mechanisms.

Upon the framing near one end thereof are mounted two castings 1ᵍ which support various cam supporting brackets and folding mechanism slides hereinafter referred to. Upon the other end of the framing are mounted two castings 1ʰ, one for each side of the machine which support various folding members and sealing plates, hereinafter referred to. The parts of the framing are securely connected and together form a substantial support for the various operative mechanisms.

On each side of the machine is a paper feeding and cutting mechanism, each operated by an independent drive to supply paper or suitable wrapping material to the wrapping mechanisms.

Loaf infeed.

Each loaf infeeding mechanism comprises a pair of endless chains 2 (see Figs. 1 to 5), upon which are located at regular intervals conveyor flights 2ʲ. These chains are driven by sprockets 2ᵉ on shaft 2ᵃ (Fig. 4), thence to sprocket 2ᶠ on shaft 2ᵍ, located below sprocket 2ᵉ. Thence horizontally to sprocket 2ʰ on shaft 2ⁱ, thence upward and outward to sprocket 2ᵇ on shaft 2ᵃ (Fig. 2), thence to sprocket 2ᵉ, the place of beginning. Shaft 2ᵃ is journaled in bearings 2ᶜ (see Fig. 2) attached to horizontal bars 1ᵉ which project beyond the outer end of brackets 1ᵈ, and their outer portions are supported by hangers 1ᶜˣ, connected to side brackets 1ᵈ. Bearings 2ᶜ are adjustable, to compensate for wear and stretch of chain 2. The outer portion of bars 1ᵉ may be further supported by braces 1ᶠˣ (Figs. 1 and 2).

The bars 1ᵉ are preferably of angle iron set with one leg of the angle projecting inwardly and the other leg upwardly, thereby forming the outer boundaries of a trough into which the unwrapped loaves are fed. To prevent a loaf being inserted too far into this trough back plates 1ᵐˣ are provided on the inside angle of each infeed or conveyor trough (see Figs. 2 and 3). Between the bars 1ᵉ are placed plates 1ⁱˣ for supporting the loaves as they are fed into the machine.

The opposite conveyor chains 2 are provided with inwardly projecting conveyor flights 2ʲ, adapted to move the loaves inwardly toward the loaf-elevator 5. As a loaf approaches the loaf elevator 5 it is straightened and properly positioned so as to be moved correctly and accurately into position on the elevator 5 by means of side guides 1$^k$ (Figs. 1, 4) which are suitably supported in the machine above the chains 2, and engage opposite ends of the loaf. The guides 1$^k$ are preferably attached to hangers 1$^m$ suspended from transverse rods 1$^n$ mounted in eyes 1$^h$ on the under sides of the members 12$^b$ of the folding table, (hereinafter referred to) and adjustable therewith towards or from each other to suit varying sizes of loaves. The conveyor chains 2 are intermittently operated by means hereinafter described.

Loaf conveyor drive.

The conveyor chain may be adjusted to shift the flights 2$^j$ forward or backward to accurately position loaves of varying sizes by any suitable means. In the construction shown (see Figs. 1, 7, 8, and 9), the inner end of shaft 2$^d$ is journaled on the center frame 1$^f$, and at its outer end in a sleeve 3 (see Fig. 8), which is rotatably mounted in the adjacent side frame 1. On the inner end of sleeve 3 is fixed an intermittent pinion 3$^g$, and on its outer end is fixed a disc 3$^a$ provided with an annular series of holes 3$^b$ (Fig. 9). Sleeve 3 is loose on shaft 2$^d$. Beside disc 3$^a$ is a disc 3$^c$, which is slidably keyed on shaft 2$^d$. The disc 3$^c$ carries a pin 3$^d$ adapted to engage any one of the series of holes 3$^b$ in disc 3$^a$. Disc 3$^c$ is held in contact with disc 3$^a$ by means of a lock nut 3$^f$ screwed on the outer end of shaft 2$^d$. Nut 3$^f$ can be loosened and disc 3$^c$ moved out to disengage pin 3$^d$ from disc 3$^a$, then disc 3$^c$ can be rotated so as to engage the pin 3$^d$ with any one of the holes 3$^b$ in the disc 3$^a$; thus adjusting the points at which the conveyor flights 2$^j$ will stop at each revolution of the shaft 2$^d$, forward or backward, as desired, until such flights will accurately center the loaves (of any given size) on the elevator 5 previous to their being elevated into the folding mechanisms.

It is desirable that the feed or incoming upwrapped loaves to each wrapping mechanism be stopped when a loaf is properly positioned on elevator 5, during the elevation of such loaf, by the elevator 5, and until the elevator has returned to its lowered position. This may be accomplished by any suitable means (hereinafter referred to).

As shown, an intermittent rotary movement is imparted to the shaft 2$^d$ to advance the loaf conveyor by the following devices:

On the sleeve 3, preferably on its inner end, (see Fig. 8) is mounted a dwell gear 3$^g$ which is adapted to mesh with an opposed dwell gear 4$^g$ on a stub shaft 4$^a$, which is continuously rotated during the operation of the machine, and preferably driven as hereinafter described, said stub shaft 4$^a$ is journaled in a bracket 4$^b$ attached to one of the side frames 1, see Fig. 8. The gear 3$^g$ has a cut away dwell or cam portion 3$^h$ (see Figs. 8 and 10) which is adapted to register with a corresponding dwell or cam portion 4$^h$ on gear 4$^g$. While these parts are in register the sleeve 3 and shaft 2$^d$ will be stopped, although gear 4$^g$ continues to rotate and as soon as the dwell 4$^h$ goes out of register with dwell 3$^h$ motion is again imparted to the shaft 2$^d$. Consequently the feed chains 2 will be moved when the gear 3$^g$ is turned and will stop when the gear 3$^g$ stops.

As shown, on the outer end of stub shaft 4$^a$ is a pinion 4$^c$ which meshes with the pinion 4$^d$ on a stub 4$^e$ (see Fig. 1) beside the stub shaft 4$^a$; and a sprocket gear 4$^f$ is attached to the gear 4$^d$, and this gear is driven by a sprocket chain 4$^i$ from a sprocket gear 4$^j$ on the adjacent end of the main cam shaft 35, hereinafter described, which cam shaft has a continuous motion.

The described mechanism provides for the desired intermittent movement of the loaf conveyor 2; and the adjustment above described provides for shifting the conveyor, forward or backward, so that when the conveyor stops the innermost loaf will have been advanced by the related flight 2$^j$ into proper position on the elevator to be taken thereby to the folding mechanism.

As shown, the loaf may be arrested in its innermost position by means of a stop plate 41$^a$, hereinafter referred to (see Fig. 4).

The loaf elevator.

By the means described the loaves are separated and successively moved toward and accurately positioned upon the loaf elevator 5 when it is in its lowermost position (Fig. 4). Said elevator 5 is shown as a flat plate mounted on the upper end of a vertically movable bar 5$^a$ which is slidably mounted in suitable guides 5$^b$ attached to the center frame 1$^f$. When the elevator is in its extreme downward position its upper surface is adjacent the inner end of the conveyor table 1$^f$ of the related loaf conveyor and practically forms a continuation of such guide plate, so that when the conveyor chains 2 stop, the innermost loaf (L) will have been moved by said conveyor (by means of flights 2$^j$) onto said elevator 5 while the latter is at rest in its lowermost position (Fig. 4). Then while the conveyor chains are stopped, as above explained, the elevator 5 is raised so as to move the innermost loaf into position to be operated on by the wrapping mechanism, which in the machine shown is located above the plane of the conveyor table 1$^f$.

As the loaf rises it is guided and properly positioned on the elevator by means of a guide plate 1ᵏˢ preferably attached to the inner ends of the bars 1ᵏ as indicated in Fig. 4, which guide the opposite ends of the loaf and will properly position same endwise on the elevator 5. As the loaf passes above the guide plates 1ᵏˢ it is further guided laterally in proper position, transversely of the elevator 5, by means of loaf guides 6 or 6ˣ arranged as hereinafter explained.

In the machine shown the elevator is raised and lowered at the proper time by suitable means. As shown, the elevator bar 5ᵃ is connected by link 5ᶜ to one end of a lever 5ᵈ attached to a rock shaft 5ᶠ journaled in the framing (see Figs. 1, 4, 7, and 27). This rock shaft has an arm 5ᵍ which is operatively engaged with a cam 5ʰ on the main cam shaft 35 by which arm 5ᵍ is caused to rock shaft 5ᶠ at the proper times to raise and lower the elevator 5 and to cause said elevator to properly dwell in its lowered position. Preferably cam 5ʰ is a race cam so as to positively control the movement of elevator 5 without resorting to the use of springs, weights, or other mechanisms.

As the elevator 5 carries the loaf L upward the loaf comes into contact with a sheet of paper S (Fig. 4) (previously positioned thereover as hereinafter described) and lifts said sheet; and the projecting side portions of the sheet are laid down against the sides of the loaf by contacting with the loaf guides (6 or 6ˣ) as the loaf is raised. In the machine shown the loaf guides 6 are arranged horizontally at opposite sides of the vertical path of elevator 5 and parallel with the sides of the loaf carried on such elevator 5, and are located just above the devices which support the sheet S before the loaf contacts therewith. The loaf guides are preferably adjustable toward or from each other, to suit the different widths of loaves to be wrapped; and they should be so adjusted that when the machine is operating and the loaf is fully raised by the elevator, the sides of the sheet S will depend below opposite sides of the loaf, as indicated in Fig. 11.

As shown in Figs. 28, to 33, the inner ends of the bars or rollers 6 are mounted in brackets 6ᵗ hung on an oppositely threaded rod 6ᵘ journaled in brackets 6ᵛ mounted on the center frame of the press. The rod 6ᵘ may be turned by a finger piece 6ʷ to simultaneously adjust the bars 6 toward or from each other. The outer ends of the bars 6 are similarly attached to brackets 6ᵗˣ which are hung on oppositely threaded rods 6ᵗᵘ mounted in brackets 6ᵛˣ, on the outer side frame. By turning the rods 6ᵘ and 6ᵗᵘ the bars 6 can be simultaneously adjusted laterally toward or from each other to accord with the width of the loaves to be wrapped.

Instead of the rods or rollers 6, I may use curved or rounded bars or plates 60 attached to bars 61, the ends of which may be entered in any one of a plurality of vertically disposed notches or slots 62 in plates 63 mounted on the side and center members of the frame, at the opposite sides of the path of the elevator, as shown in Figs. 6, 34, 35. These bars 61 can be removably confined in the slots 62 by means of top plates 64 which may be detachably fastened down upon the top of the plates 63 to close the slots, by means of a thumb nut or screw 65 (as indicated in Figs. 34, 35). By loosening the thumb nuts 65 the plates 64 can be removed, and then the bars 61 can be adjusted toward or from each other to the desired position, and engaged with the proper slots 62 and then plates 64 replaced. Obviously the curved plates 60 could be mounted on the rods 61 in place of the rollers or rods 6; or the rollers or rods 6 might be mounted on the rods 61 in place of the curved bars 60. For convenience and simplicity of operation I prefer to use the loaf guides shown in Figs. 28 to 33.

*The loaf holders.*

As the loaf is raised by the elevator, and as it passes above bars 6 it enters between two opposed loaf holders 7 and 8 (Figs. 1, 4, 6, 11–14) which are operatively carried by devices attached to a slide 7ᵇ hereinafter described, and which are relatively yielding so that they can accommodate themselves to the loaves. When the slide 7ᵇ is retracted, as shown in Fig. 4, the loaf holders 7 and 8 lie at opposite sides of and slightly in the path of the loaf L when it is raised by elevator 5; and as the loaf rises it enters between said loaf holders 7 and 8, causing them to slightly yieldingly separate, and slide down the portions of the wrapper S at opposite sides of the loaf and assume the positions shown in Fig. 11.

The loaf holders 7 and 8 are preferably adjustable to and from each other, as hereinafter described, so that they may be set to properly grasp between them the loaf to be wrapped. For thin loaves the plates 7 and 8 should be adjusted so that when the slide is retracted as in Fig. 4, the clamps will be about equally spaced from the center line of the elevator 5. If thicker loaves are to be wrapped the clamps 7 and 8 should be adjusted a little further apart, to correspond with the widths of such loaves when centered upon the elevator 5.

The loaf holder 7 is preferably pivotally mounted on a bracket 7ᵃ (see Figs. 4, 6 and 11) which is adjustably attached to the inner end of the slide 7ᵇ. Said slide 7ᵇ is guided in horizontally disposed ways 7ᶜ mounted on castings 1ʲ at the end of the main frame adjacent the cam shaft 35. Said slide 7ᵇ is reciprocated at the proper time, as hereinafter described.

The loaf holder 8 is preferably pivotally mounted on the free ends of arms 8ª (see Figs. 4, 6 and 11–14) which are pivoted at 8ᵈ to a bracket 8ᵐ which is adjustably attached to the free end of a swingable cam lever 8ᶜ, which is pivoted at 8ᵈ to lugs 7ᵈ on slide 7ᵇ. The lever 8ᶜ is provided with a cross bar 8ᵉ, which may be formed integral therewith, and the ends of this cross bar engage with cam slots 9ª formed in the opposite faces of opposed castings 9 arranged at opposite sides of and above the reciprocating slide 7ᵇ, as indicated in Figs. 5 and 6.

The support 7ᵇ for loaf holder 7 is practically unyielding, but to compensate for slight variations in width of loaves the arms 8ª supporting loaf holder 8 are preferably yieldingly held in gripping position. As shown, the arms 8ª have an extension 8ᶠ above their pivot, which extension is connected to a spring rod 8ᵍ slidable through a swivel stud 8ʰ mounted on bracket 8ᵐ. A spring 8ⁱ is interposed between the swivel stud 8ʰ and an adjustable collar 8ʲ on the rod 8ᵍ and normally tends to hold the loaf holder 8 yieldingly towards loaf holder 7.

The slide 7ᵇ should be in its outermost position when and while the elevator 5 raises the loaf L as above described, and as the elevator raises the loaf to its highest point of travel it is entered between the loaf holders 7 and 8 and firmly held thereby in accurate position for the next operation on the sheet, and while the elevator 5 is lowered to receive the next incoming loaf.

The first folds.

After the loaf has been raised to the position shown in Fig. 11 and while it is held by and between the loaf holders 7 and 8, and after the elevator 5 has been lowered sufficiently out of the way, a tucker blade 10 (arranged to operate below the slide 7ᵇ and holders 7 and 8, see Fig. 4) is moved toward and under the loaf and folds or turns the adjacent depending portion of the sheet S (see Fig. 11) beneath the loaf as indicated in Fig. 12, while the loaf remains stationary. Blade 10 then dwells and supports the loaf while the first end folds are made and until the partly wrapped loaf is moved off of the blade as hereinafter explained.

As shown (see Figs. 4 and 11) the blade 10 is attached to a slide 10ᵇ which is mounted to reciprocate in suitable guides attached to castings 1ᵍ supported on the main frame. Said slide 10ᵇ is connected by an adjustable link 10ᶜ to the upper end of a cam lever 10ᵈ (Figs. 4, 15, 16) which lever is pivoted on a transverse shaft 10ᵉ journaled in the main frame 1 and has a pin or roller 10ᶠ engaging a race cam 10ᵍ on the main cam shaft 35, (Figs. 7 and 27) and cam 10ᵍ is so shaped as to impart the desired reciprocatory movements and dwells to the tucker blade 10 at the proper time during each revolution of the cam shaft.

The second fold.

After the tucker blade 10 has folded the first bottom flap of the sheet under the bottom of the loaf and while the loaf rests on said blade the first end folds of the wrapper are made by means of end folder blades 11, which blades are arranged at opposite ends of loaf holder 7 and operate above the tucker blade 10. Said blades 11 are preferably angle or channel shape in section and are adapted to engage the side portions of sheet S adjacent holder 7 and projecting beyond the opposite ends of loaf and to fold the same inwardly as indicated in Fig. 12. These end folder blades 11 are preferably adjustable toward and from each other. As shown, they are connected by bolts 11ª (see Figs. 15 and 16) to a bar 11ᵇ which is attached to the reciprocating slide 11ᶜ, said bolts engaging slots 11ˢ in bar 11ᵇ, so that the blades 11 can be adjusted to or from each other to suit different lengths of loaves to be wrapped. The slide 11ᶜ is connected by a link 11ᵈ to the upper end of a cam lever 11ᶠ which is pivoted on the transverse shaft 10ᵉ journaled in the main frame and provided with a pin or roller 11ᵍ engaging a race cam 11ʰ on the cam shaft 35, (Figs. 4, 7, and 27) said cam being so shaped as to cause reciprocation of side folders 11 at and in the proper time and manner to cause the same to fold the opposite end portions of the side of the sheet adjacent holder 7 after the first bottom fold has been made by blade 10, and then to hold said end folds in position and move on with the loaf until the opposite bottom and side end folds are made, as hereinafter explained.

The third fold.

The slide 7ᵇ and holders 7 and 8 remain stationary while the blades 10 operate to make the first bottom fold and blades 11 operate to make the first end folds, as above described (Fig. 12). But, after the tucker blade 10 and the first end folders 11 have respectively made the first bottom and end folds, as described, the slide 7ᵇ is moved inwardly, thereby causing holders 7 and 8 to move the partly wrapped loaf off the tucker blade 10 and onto a folding plate 12, which is mounted on the castings 1ʰ, and lies at about the same level as the tucker blade 10 (see Fig. 4).

The inner edge of the folding table 12 lies slightly above the adjacent bar or roller 6, and as the partially wrapped loaf is moved off the tucker blade 10 and onto the folding table 12 by the forward movement of slide 7ᵇ (the folders 11 being also simultaneously moved forward with the loaf) the lower portion of the inner side of the sheet S adjacent holder 8 is folded up beneath the bottom of the loaf by contact with the edge of folding table 12, thus completing the bottom folds as shown in Fig. 13.

As the loaf is thus moved outward off the plate 10 and onto folder table 12, and after the folder table 12 has begun to fold the second bottom flap beneath the loaf, the holder 8 is raised upwardly and away from the loaf by the engagement of the ends of bar $8^c$ with the inclined portions $9^x$ of the camways $9^a$; and by the time the second bottom flap is completed the holder 8 has been raised above the top of the loaf and remains raised out of the way during the further inward movement of the slide 7, and during the remaining folding operations on the sheet S.

The fourth fold.

The aforesaid outward movement of the loaf (while being held between folders 11 and moved outward by loaf holder 7, actuated by slide $7^b$) brings the inner end portions of the sides of the wrapper S projecting beyond the ends of the loaf into engagement with the second end folders 13.

The second end folders 13 are shown as segmental metallic blades which are supported by brackets $13^a$ attached to the folding table 12 (see Figs. 4 and 11–14), said blades being arranged at opposite sides of table 12 and near the inner or folding edge thereof (Fig. 6). The tucker blades 13 engage the unfolded side portions of the wrapper S projecting beyond the ends of the loaf and form the second end folds therein (see Fig. 13) as the loaf is advanced over folding table 12 and between said blades 13. These second end folds overlie the first end folds and the end folder blades 13 also serve to hold the overlapped side end folds while the lower and top end folds are being made. The end folders 11 are advanced with the loaf until they nearly contact with folders 13 (see Figs. 12 and 13) and then dwell until the side end folds are completed, then they are retracted before another loaf is raised to wrapping position.

The fifth fold.

The lower end folds are next made by means of folding blades 14 attached to opposite sides of folding table 12 and in alignment with the folders 13. The operative or forward ends of folders 14 are curved upwardly and outwardly, as shown at $14^a$, and the adjacent ends of folders 13 are similarly curved and the space between the two curved edges of the adjacent folder 13 and blade 14 form openings or slots $14^a$, which are traversed by the remaining projecting unfolded bottom portions of the wrapper S, as the loaf is moved outward.

As the loaf is advanced outwardly over the folding table 12 and past the folders 13 the projecting lower portions of the partly folded wrapper come into contact with the lower curved edges of the folding blades 14 and are raised up by the upwardly curved edges of said blades in slot $14^a$, and are folded thereby, the bottom end fold portions turning upwardly through slots $14^a$ until the bottom end folds are completely made, as in Figs. 13 and 14.

The sixth fold.

After the partially wrapped loaf has been advanced by the outward movement of slide $7^b$ onto the folding table 12 and past the end folders 13 and the opposite side end folds and bottom end folds have been made as above described the next folds are made by folding blades 15, while the loaf is further moved outwardly. The folding blades 15 are attached to the inner ends of the levers $15^b$ (Figs. 1, 4, 5, 11–14) which are fulcrumed at $15^c$ on studs $7^f$ projecting from the slide $7^b$ and located in advance of the studs $7^d$ on which the levers $8^c$ are pivoted. The levers $15^b$ extend beyond their pivots $15^c$ and their outer ends may be provided with pins or rollers $15^d$, which engage the same cam slots $9^a$ in brackets 9 that are engaged by rollers $8^e$ on the levers $8^c$.

The cam slots $9^a$ operate both levers $8^c$ and $15^b$ and are so formed that near the inward end of the movement of slide $7^b$ the rollers $15^d$ engage the inclined parts $9^x$ of the cam grooves and cause the levers $15^b$ to rock and lower the folding blades 15, and as the latter lower they engage and fold down the top portions of the wrapper projecting beyond the ends of the loaf, thus making the final top end folds. These final top end folds are made after the loaf has passed the folding blades 13, and after the bottom end folds have been made by the action of the folding blades 14, as above described; and are made as the loaf is moved between said blades 14 to and between the fold shields 16.

Preferably the blades 15 are adjustably attached to the levers $15^b$ so that said folder blades may be adjusted toward or from each other to suit the varying lengths of loaves to be wrapped. The folders 13 and 14 are also preferably adjustable toward or from each other to suit different lengths of loaves to be wrapped, said adjustment being made as hereinafter described.

Before the final top end folds are made, and before the folding blades 15 begin to move downward, the levers $8^c$ are lifted by their rollers $8^e$ riding up on the inclined portions $9^x$ of cams $9^a$, and raise loaf holder 8 to the position indicated in full lines in Figs. 13 and 14, and remain in this position while the folders 15 are being operated during the further inward movement of slide $7^b$ which further movement of slide 7$^b$ forces the loaf further outward on table 12 and causes the rollers 15$^a$ of the levers 15$^b$ to operate the folding blades 15 and make the final top end folds as described.

It will thus be seen that a single cam 9$^a$ (or a pair of like cams 9$^a$) controls the operation of both the loaf holder 8 and the final folding blades 15.

In the outward movement of the slide 7$^b$ the end folders 15 are first lifted away from the loaf while the loaf holder 8 is held in its raised position, until both are moved backward sufficiently to clear the wrapped loaf. Then as the slide 7$^b$ nears its outermost position holder 8 will be lowered while the folding blades 15 will remain in raised position. Although the loaf holder 8 and folding blades 15 operate at different times and in different manners it will be seen that the same cam 9$^a$ effects the lifting and lowering of holders 8, the lowering and lifting of blades 15, and effects the necessary and timely motions and dwells of both holder 8 and folding blades 15, although they occur at different times.

During the return movement of slide 7$^b$ to its outermost or retracted position (see Fig. 4) the just wrapped loaf remains completely folded on the folding table 12 between the opposite fold shield plates 16, (Fig. 6) which shield plates hold the folds of the wrapper in position until the wrapped loaf is moved onto and between the sealing plates 17 by the outward movement of the next wrapped loaf.

As shown in Figs. 13 and 14 the blades 15 are attached to angular bracket plates 15$^n$ which are fastened by bolts 15$^c$ to the inner ends of the levers 15$^b$ which are slotted as shown so as to permit the plates 15 to be adjusted toward or from each other to suit different lengths of loaves.

Said shields 16 are yieldable and have their innermost faces curved so as to hold the completed folds and allow passage of the loaf to and between the side sealing plates without distorting said folds. The shields 16 are preferably adjustable toward or from each other to conform to the varying lengths of loaves to be wrapped.

The end folding plates 13 and the bottom end folding plates 14 and the plates 16 should be adjustable toward or from each other to suit the length of the loaves being wrapped. They are preferably rendered so adjustable by mounting them upon the opposite side members 12$^b$ of the table 12, which side members are adjustable toward or from each other as hereinafter explained.

In order to hold the sheet properly in position on the loaf during the folding operations a spring presser plate 70 is attached to slide 7 as indicated in Figs. 1-4, and 11-13, and when the loaf is raised plate 70 will keep the sheet of paper from slipping on the loaf during the initial folding operations, and also helps to keep the loaf and paper properly pressed down on the table during the forming of the second folds and the bottom end fold. This presser plate 70 may be adjustable in any suitable way to suit loaves of different heights, and to regulate its pressure upon the top of the loaf.

*Sealing the folds.*

After the final end folds have been made the completely wrapped loaf will be moved further outward on the folding table 12 between the rearward extensions of folder 14 and opposite yieldable fold retaining shields 16 by the advance onto the table of the next loaf that is wrapped, the successive loaves being moved outward by slide 7$^b$ as previously described. When the wrapped loaf is advanced beyond shields 16 it passes onto or over a heated bottom sealing plate 17$^a$ (Figs. 4 and 6) and between heated side sealing plates 17, whereby the lapping folds of the paraffined paper wrapper S are sealed by heating the paraffined paper.

The hot sealing plates may be of any suitable construction but are preferably electrical, and are adapted to applying heat to the bottom and end folds of the paraffined paper wrapper and at the same time press the folded ends together.

As shown, the sealing plates 17 are supported by means of rods 17$^a$ passing through brackets 17$^b$ (Figs. 1 and 6) attached to the folding table 12. Springs 17$^c$ may be placed on rods 17$^a$ between said sealing plates and brackets to press the sealing plates 17 yieldingly inward.

The folding table 12 is preferably constructed (as hereinafter described) so that by means of a single adjusting screw the end folders 13 and 14, together with shields 16 and side sealing plates 17, all of which are attached to said table 12, (said table 12 being composed of several members) may be simultaneously moved toward or away from each other to suit the particular length of the loaves being wrapped.

As shown (see Figs. 4, 6 and 11) the table 12 is composed of a central plate 12$^a$ and two side plate 12$^b$ which are arranged parallel and extend lengthwise of the machine, and are supported on rods 1$^n$ suitably journaled or supported on the main frame, said rods passing through eye-lugs on the bottom of the plates, as shown. The plates 12$^b$ are laterally movable toward or from plate 12$^a$. Intermediate the rods 1$^n$ is a rotatable rod 1$^c$ which is oppositely threaded adjacent its opposite ends and the threaded portions of this rod engage correspondingly threaded bores in lugs on the undersides of the plates 12$^b$. The rod 1$^c$ can be rotated by applying a wrench to the squared end 1ᵖ thereof. By properly turning rod 1ᶜ the threaded portions thereof will cause the plates 12ᵇ to move toward or from each other, and as the folders 13 and 14 and shields 16 are carried by the plates 12ᵇ they can be simultaneously adjusted therewith toward or from each other to suit the length of loaves to be operated upon, as above described. As shown the bottom sealing plate 17ⁿ is supported upon the plates 12ᵃ, 12ᵇ, which are suitably recessed or cut away to accommodate said sealing plate, (Figs. 4 and 6) so that the upper surfaces of the sealing plate 17ⁿ are practically flush with the upper surface of the plates 12ᵃ, 12ᵇ.

Creasing the top end fold.

As loaves of substantially the same weight and size will vary somewhat in height, particularly at the ends thereof, I provide means for partially creasing the top end folds preparatory to the final folding thereof, so that the top end folds when completed will present a neat and uniform appearance. For this purpose creasing blades 13ⁿ are provided, which may be conveniently mounted upon the folders 13. As shown (Figs. 4, 11–14) these creasing blades are pivoted on the outer sides and near the inner ends of said blades 13 and above the slots 14ᵃ, and are so arranged that they may be turned upward so that the upper edge of the creasing blade 13ⁿ will be set more or less above the upper edge of the related folding blade 13 according to the height of the loaves being wrapped. As the partially wrapped loaf passes the folder 13 the edge of the creasing blades 13ⁿ will pass under and across the projecting top end portions of the wrapper and lightly crease or score the same along the line of the top end fold so that when the folding blades 15 descend the projecting top ends of the wrapper will neatly fold down, on the lines of such creases or scores squarely over the previously folded bottom end folds, and when the completely wrapped loaf emerges the end folds will present a neat and uniform appearance. While the loaf would be effectively wrapped by the mechanism described even if the creasing blades 13ⁿ were not used, yet if such creasing or scoring devices were not used, should the loaf not be square and true on its ends, the top end folds would be askew, and such folds when completed would have flat ends instead of the desirable pointed ends, and the appearance of the wrapped loaves would not be smooth and uniform. The pivot of the blade 13ⁿ should be so tight that the blade will remain in any position to which it is manually adjusted.

The loaf compressor.

The loaves as they enter between the shields 16 and pass the sealing plates are held down upon the folding table by a compressor of any suitable construction. As shown (Figs. 1, 4, 6) this compressor comprises a bar 18 sustained in axial alignment above and between the shields 16 and side sealing plates 17 by means of rods 18ᵃ passing through guide brackets 1ᵖ attached to the main frame. Said bar 18 is yieldingly pressed downward by means of springs 18ᵇ strung on rods 18ᵃ between the upper ends of the guide brackets and collars 18ᶜ on the rods, and the pressure is regulable by adjusting the collars 18ᶜ. The normal height of bar 18 above the folding table 12 may be regulated by means of collars 18ᵉ adjustably attached to rods 18ᵃ above the brackets 1ᵖ. The compressor 18 should be adjusted to hold the completely wrapped loaf in contact with the folding table 12 during the final folding operation, and with the bottom sealing plate 17ⁿ, thereby insuring that the loaf will be completely sealed when delivered.

The loaf discharge and cooler.

The wrapped loaves are successively pushed past the sealing heater plates 17 and 17ⁿ and on out of the machine by the reciprocations of holder 7. This holder 7 acts not only as a loaf clamp during the wrapping of the loaf as above described, but also as a pusher or ejector to push the wrapped loaves successively outward; and the last wrapped loaf pushes the previously wrapped loaves outward to the discharge.

After passing the sealing plates the wrapped loaves may be removed by hand, or by any suitable delivery means. Preferably I provide novel means for carrying the wrapped loaves out above the infeeding mechanism, and giving the wrappers time to cool and set before the loaves are removed. As shown, the delivery comprises a bottom member and opposite side members which together form a cooling and discharge trough which is supported upon brackets 1ᵈ, and extends outward from the plates 17 above and parallel with the infeed conveyor chains 2 (see Figs. 1, 2, 3).

As shown, each side member of this trough is preferably formed of a series of parallel bars 20 (Figs. 2, 3) transfixed by rods 20ᵃ; rollers or disks 20ᵇ may be mounted on these bars if desired (see Figs. 3 and 3ᵇ) but are not essential.

The side members of the discharge trough are supported on brackets 21 which are adjustable toward or from each other so as to adjust the width of the discharge trough to suit the length of the loaves; and the side members of the trough keep the end seals closed until they have been sufficiently cooled to make them adhere. The opposite brackets 21 are preferably supported on rotatable shafts 21ª mounted in the brackets 21, said shafts 21ª having oppositely threaded portions engaging threaded openings in the said brackets, so that by turning said shafts right or left the side members of the discharge trough will be moved toward or away from each other to suit the length of the wrapped loaves being delivered.

The brackets 21 may be further guided and supported by means of through bars 21ᶜ attached to the frame or brackets and passing through openings in the brackets below the screw shaft 21ª.

The side members of the trough are preferably capable of a slight yielding movement outward. As shown the bars 20 of the side frames are slotted at 20ᵍ for the passage of bolts 20ʰ by which they are attached to the brackets 21 so as to permit slight lateral movements of the side members of the trough relative to said bars, the side members being yieldingly pushed inward by suitable springs. As shown, a bolt 21ⁱ is pivoted at one end to one of the bars 20 of the adjacent side frame and its free end extends through an eye in a lug 21ʲ on the adjacent bracket 21 and a spring 21ᵏ is interposed between the said lug and the head of the bolt, and thus holds the side frame inward with a yielding pressure.

The bottom of the trough may be formed in any suitable manner. As shown it is formed by a belt 80 which runs over a roller 80ª mounted on a shaft 80ᵇ journaled in the outer end of the brackets 1ᵈ, (Fig. 2), and over a roller 80ᶜ on a shaft 80ᵈ mounted in the brackets 1ᵈ adjacent brackets 1ᵉ (Fig. 1). The belt may be driven by any suitable means. As indicated in Fig. 1 roller 80ᶜ is driven by sprockets and sprocket chain 80ᵉ from a shaft 80ᶠ mounted in brackets 1ⁿ attached to the main frame; and shaft 80ᶠ is driven by sprocket and sprocket chains 80ᵍ from a sprocket on the continuously running shaft 4ª so that the belt 80 will be continuously moved at a suitable speed. The particular means for actuating this belt is not claimed herein and therefore is only conventionally indicated in the drawings.

Means of operating the slides.

The slides 7ᵇ may be operated at the proper time and in the proper manner by any suitable means. As shown (Figs. 1, 4, 7) a gear rack 7ᵉ is attached to the outer end of slide 7ᵇ and passes through a guide 1ʳ attached to the main frame. This rack meshes with a gear 7ᶠ rotatably mounted on a through shaft 7ᵍ journaled in the main frame. To the gear 7ᶠ is attached a pinion 7ʰ which pinion meshes with a gear segment 7ⁱ mounted on the upper end of an oscillatory lever 7ʲ, which lever is fulcrumed at its lower extremity on a through shaft 7ᵏ, journaled in the main frame (see Figs. 1, 4, 7). Said lever 7ʲ carries a pin or roller 7ᵐ engaging a race cam 7ⁿ on the main cam shaft 35 (Figs. 4 and 27), which cam is properly shaped to operate the slide 7ᵇ backward and forward and cause it to dwell in and at the proper time and manner.

The main drive mechanism.

In the machine illustrated the cam shaft 35 is composed of two members, 35ª and 35ᵇ (Figs. 7 and 27). Shaft 35ª is journaled at its outer end in main frame 1 and at its inner end in a coupling 35ᶜ, which coupling is rotatably mounted in center frame 1ᶠ. Said shaft 35ª projects through said coupling 35ᶜ and into coupling 35ᵈ as shown in Figs. 7 and 27. Shaft 35ᵇ is journaled at its outer end in opposite side frame 1 and on the other end in coupling 35ᵈ. Thus said cam shaft assembly presents a split drive of ample rigidity and strength (couplings 35ᶜ and 35ᵈ being securely bolted together).

Journaled in each side frame 1 and center frame 1ᶠ is a main drive shaft 37 on each end of which is slidably mounted a slip pinion 37ª meshing with a gear 35ᵉ attached to the adjacent outer end of cam shaft sections 35ª and 35ᵇ. Said drive shaft 37 is preferably driven by a train of gears 37ˢ from a motor M, as indicated in Fig. 1.

A slip gear is provided at each side of the machine so that either section 35ª or 35ᵇ of the cam shaft may be put in or out of operation, so that both the sections may be operated simultaneously, or either one of them may be operated independently of the other. The particular means for driving the cam shaft sections forms no part of the present invention, and may be varied to suit the designer, and therefore does not require a more specific illustration or description herein.

It will be seen that by slipping either or both slip pinions 37ª out of mesh with their respective mating gears 35ᵉ, either or both sides of the machine may be silenced. Thus when slip pinion 27ª is engaged with its main gear 35ᵉ that side of the machine is directly connected with the motor M and every moving part will properly function. Should the slip pinion 37ª on the opposite side of the machine be disengaged from its mating gear 35ª the drive on that side of the machine is effectively broken and no normally moving part will function.

By using a divided cam shaft construction as above described, a plurality of similarly constructed feeding, wrapping, and delivering units, as described, may be mounted on a common frame, and each unit may be operated with or independently of any other similar unit, or the complete assembly of such units may be simultaneously operated as a whole. Further, such units may be so timed that their cycles of operations will be performed in unison, or preferably, their cycles of operations are not performed in unison, but are mismatched in the cam shaft cycle, thereby producing a more continuous and uniform power demand on the motor M and reducing vibrations of the machine to a minimum.

*The paper feeding device.*

The sheets of wrapping paper may be supplied to the wrapping mechanism in any suitable manner by any suitable means. Preferably the sheets are supplied from a web $w$ fed to the machine and severed into sheets. In the machine shown, (Figs. 1, 5, 7) a roll of paper W is mounted on a shaft 22 suitably and removably supported in brackets 1$^r$ on the main frame. The paper web is led upward from roll W to and over a guide roller 22$^a$ mounted in arms 23$^a$ attached to brackets 23 which are supported on the main frame; and from roller 22$^a$ the web is led to feed rolls 24 journaled in bearings in brackets 23; (Figs. 5 and 22) with which coact feed discs 24$^a$ mounted on a shaft 24$^b$ journaled in bearings 24$^c$ slidably mounted in vertical slots in the brackets 23 and which are normally depressed by means of springs 24$^e$ interposed between screws 24$^f$ and the boxes 24$^c$ to cause the discs 24$^a$ to bite the web against the feed roller 24. The shaft 24$^b$ and discs 24$^a$ may be moved away from the roll 24, to free the paper, by means of cam levers 24$^g$ (Fig. 22) pivoted on one of the brackets 23 and having a short cam end adapted to engage the adjacent box 24$^c$ and raise the latter when the longer arm of the cam lever is depressed.

Shaft 24$^b$ is provided at one end with a gear 24$^i$ (Figs. 1 and 6) meshing with a gear 24$^j$ on the shaft of roll 24 so that the peripheries of the roll 24 and disc 24$^a$ rotate at the same speeds.

The shaft of roll 24 has a beveled pinion 24$^k$ on one end meshing with bevel gear 25$^k$ on a short shaft 25 journaled in suitable bearings 25$^v$ attached to the paper feed base 32 adjacent to the gear end of roll 24 (see Figs. 1, 6), and on this shaft is keyed a clutch member 25$^b$ (Fig. 17) inside of which is a loose clutch member 25$^a$. Any suitable clutch may be used such that when the loose clutch member is moved in one direction no motion will be imparted to the shaft 25, but when the loose clutch member is moved in the other direction motion will be imparted to said shaft 25.

Preferably I use a roller clutch (such as shown in Fig. 17) and the loose or oscillating member 25$^a$ of this clutch is provided with an arm 25$^c$ having a slot 25$^d$ in which is adjustably mounted a block 26. To block 26 is pivotally connected the upper end of a pitman 26$^c$ (Fig. 1) on the lower end of which is a longitudinally slotted head 26$^d$ the slot in which is engaged with a crank pin 26$^e$ on a gear 26$^f$ mounted on a stud 26$^g$ and meshing with a like gear 26$^h$ fixed on the adjacent end of the main cam shaft 35.

For each rotation of the cam shaft 35 the rod 26$^c$ will be reciprocated once and the arm 25$^c$ thereon rocked back and forth, and by this means an intermittent movement is imparted to the shaft 25 and therefrom to the feed roll 24, so that at the proper time a sufficient length of web will be fed into the machine above the elevator 5 to supply a sheet for each loaf to be wrapped.

The length of web fed at each operation should be just sufficient to provide a sheet of the proper length to suit the size loaf to be wrapped. In the machine shown the length of the sheet supplied is regulated by adjusting the position of the block 26 in the slot 25$^d$. As shown (Fig. 17) block 26 has a lug 26$^a$ which projects opposite one side 25$^e$ of arm 25$^c$, and in this side of the arm 25$^c$ is a series of screw holes 25$^f$ which are mathematically spaced with reference to the axis of the shaft 25. Block 26 can be secured in any adjusted position in slot 25$^d$ by means of screws 26$^b$ transfixing the lug 26$^a$ and engaging the proper holes 25$^f$. Thus the block 26 is secured at any desired predetermined distance from the axis of shaft 25, and any desired predetermined extent of oscillation can be imparted to the arm 25$^c$ from a uniform extent of rotation or throw of the crank pin 26$^e$; and thus a proper length of paper web is fed in for each loaf brought to the wrapping mechanism at each operation of the machine.

To insure quick action and disengagement of the clutch when the arm 25$^c$ is initially started downward by pulling on the rod 26$^c$ a spring means may be employed normally tending to start the arm 25$^c$ downwardly when it is in its raised position. As indicated in Fig. 17, the arm 25$^c$ may be provided with a hardened stud 25$^o$ which when the arm is returned to normal position engages the upper end of a plate spring 25$^s$ secured at its lower end to a suitable part of or on the main frame by means of bolts 25$^t$. This spring 25$^s$ serves to prevent overthrow of the arm 25$^c$ on its return stroke, and also is put under tension when the arm 25$^c$ is fully raised; and when the rod 26$^c$ starts downward the spring 25$^s$ causes the arm 25$^c$ to instantly start with it and insures immediate disengagement of the clutch on the initial downward movement of the arm 26$^c$ in all positions of the block 26 in the slot 25$^d$. The part 25$^e$ may be graduated or marked adjacent the perforations or holes 25$^f$ to show the operator in what position to adjust the block 26 to insure the proper length of paper being fed to suit the size of loaf being wrapped.

The paper feed trip.

Suitable means are also provided to prevent a sheet of paper being fed in case no loaf is present to be wrapped. As shown (see Figs. 1, 17–19) to the arm $25^c$ is pivotally connected one end of a rod 27 the lower end of which is guided in a rocking guide $27^a$ pivoted to an adjacent part of the frame. On the lower end of rod 27 is a toe $27^b$ which is adapted to be engaged by a gravital catch $27^c$ attached to a rock shaft $27^d$, journaled in the frame. Rock shaft $27^d$ has an arm $27^e$ which is pivotally connected to one end of a rod $27^f$, the other end of which is pivotally connected to an arm $27^g$ on a rocker shaft $27^h$ journaled in the main frame adjacent the elevator 5 and below the upper runs of the related conveyor chains 2. To the shaft $27^h$ is attached a trip finger which projects above the upper run of the chains into the path of the infed loaves and is adapted to be successively engaged by each incoming loaf before it reaches the elevator 5. When this trip finger is engaged by a loaf it actuates the arm $27^g$ and causes rod $27^f$ through the described connections to swing the catch $27^c$ out of engagement with the toe $27^b$, and this permits rod 27 and the arm $25^c$ to drop by gravity so that the crank pin $26^e$ will engage the upper end of the slotted head $26^d$ of the member $26^c$ and raise the rod $26^c$ and cause it to rock arm $25^c$ through the desired arc of movement, thereby actuating the feed roll 24 to feed in the proper length of paper web while the loaf which caused the tripping is being moved onto the elevator 5.

While the trip finger might be integral with the arm $27^g$ I prefer to form the trip finger $27^o$ on one end of a rod $27^n$ which is adjustably engaged with a guide opening in an arm $27^i$ attached to the shaft $27^h$ or arm $27^g$, so as to move with the arm $27^g$. This trip finger $27^o$ may be adjusted backward or forward on the arm $27^i$ so as to move the trip $27^o$ nearer to or away from the shaft $27^h$ to regulate the point or time of contact of a loaf with the trip finger. As the machine may be used for wrapping loaves of different sizes (at different times) it is desirable to have the trip finger $27^o$ adjustable so that the feed mechanism will be operated at the proper time, according to the size of the loaves being wrapped. If thick loaves are being wrapped the rod $27^n$ should be adjusted inwardly so that the trip finger $27^o$ would be engaged by such loaves at the proper moment to effect the tripping; and if narrower loaves are being wrapped the rod $27^n$ should be adjusted to move the finger $27^o$ toward the shaft $27^h$ so that it would be engaged by such loaves at the proper time to trip the feed.

The trip finger $27^o$ projects upwardly from the inner end of the rod $27^n$ and may extend through a slot in the plate $1^{tx}$, as indicated in Fig. 19, the slot being long enough to admit the desired adjustment of the trip finger.

Each time the arm $25^c$ is raised (thereby raising the rod 27) latch $27^c$ swings back under the toe $27^b$ and holds the rod 27 and arm $25^c$ in raised position, until the latch is again released by an incoming loaf actuating trip finger $27^i$, as above described.

If there should be no incoming loaf moved forward by the conveyor the rod 27 and arm $25^c$ will remain upheld by the catch $27^c$, and the rod $26^c$ will simply be swung idly by the pin $26^e$ which should then work freely in the slot in the head $26^d$, as the arm $25^c$ would be held in its raised position by rod 27 and latch $27^c$. Pin $26^e$ has no operative effect upon the rod $26^c$ and arm $25^c$ until and unless the latter is permitted to lower by the disengagement of catch $27^c$ from rod 27.

The paper cutting devices.

After passing the roller 24 the sheet of paper is led inward over a sheet supporting plate 28 past the cutting devices to and over sheet guides and supports above the sheet elevator and below the bars 6. The cutting devices are mounted on a casting 32, to which is attached a bracket 29; attached to the inner edge of this bracket is a cutting bar $29^a$ which is preferably made of hardened steel (see Figs. 5, 22, 23). With this bar $29^a$ cooperate knives $29^b$ which are fastened to plates $29^c$ pivoted at $29^d$ on arms 30 pivoted at $30^a$ to the standards so as to suspend the knife bars $29^b$ below the cutter bar $29^a$. The outer ends of the knives $29^b$ abut against guides $29^f$ on ends of bracket 29, beyond the edge of the paper web. The cutting edges of the knives $29^b$ are made to closely contact with the bar $29^a$, in operation, by means of springs $30^c$ on bolts $30^a$ attached to lugs on arm 30 and extending through openings in arms $29^{fx}$ on the lower edges of bars $29^c$ (see Figs. 5, 22, 23).

Preferably the knives $29^b$ are set so that their cutting edges are inclined at acute angles to the shear edge of the bar $29^a$, and at an obtuse angle to each other. Assuming that the bar $29^a$ is horizontal (as indicated in Fig. 23) the outermost ends of the knives $29^b$ would be higher than their inner ends. Furthermore the holders $29^c$ are slightly inclined so that when the knives are viewed from above (as in Fig $23^a$) the inner ends of the knives will apparently be closer to the roll 24 than the outer ends thereof. By reason of this practically double angularity of the knives (in both horizontal and vertical planes) it results that when the knives are raised they will make a close shear cut against the edge of the blade $29^a$ from their outer to their inner ends, and will cut the web of paper with a clean shear cut from both edges of the paper inwardly towards the center thereof.

The knives 29$^b$ normally are in lowered position as shown, but are raised at the proper time to sever the paper by suitable means.

As shown in Fig. 24, one end of a rod 31 is pivotally connected by a swivel joint 31$^s$ to a block 31$^t$ on one arm 30, and the lower end of said rod is pivotally connected to a lever 31$^a$ (see Fig. 4) which is pivoted at 31$^b$ to the main frame, adjacent the cam shaft 35, and said lever 31$^a$ is provided with a roller 31$^c$ engaging a cam 31$^e$ on the cam shaft 35, so that for each operation of the machine and at the proper time, the knives 29$^b$ are caused to raise and sever a sheet of paper from the web, a sufficient length of web having been previously fed in past the knives by the feed roll 24 and feed discs 24$^e$, as above described.

The paper should be cut to suit the loaves being wrapped, and therefore the sheets for different sizes of loaves must be severed from the web at slightly different distances from the longitudinal center of the wrapping devices. In order that the severed sheet shall be properly centered over the loaf when the latter is raised by the elevator prior to the beginning of the wrapping operation the entire feeding mechanism is preferably made bodily adjustable outwardly and inwardly; and as shown I preferably slidably mount each feeding mechanism support 32 on guide brackets 33 attached to the adjacent side of the main frame, as indicated in Figs. 1, 5, 22. This support 32 has a depending internally screw threaded eye or lug 32$^a$ which is engaged by a threaded bolt 34, the outer end of which extends through an eye bracket 34$^c$ attached to the side of the main frame, the bolt 34 being rotatably but longitudinally immovably mounted in said eye bracket. By turning the bolt 34 all the feeding and cutting devices mounted on the support 32 can be bodily moved inward or outward, so that the sheet of paper when severed from the web will be properly centered above the loaf to be wrapped.

The severed sheet should be supported above the loaf elevator in position to be taken up by the loaf. As shown (Figs. 5, 25, 26) an angle bar 40 is attached to the brackets 32 and to this bar are attached brackets 48 carrying rods 40$^b$ on which are mounted spaced bars 40$^c$ the other ends of which are supported on a rod 40$^d$ which is slidably mounted in slots in brackets 40$^e$ attached to the center frame, as indicated in Figs. 5 and 25. Sufficient space is left between the bars 40$^b$ and 40$^d$ and between the innermost bars 40$^c$ to permit the passage of a loaf therebetween, and as the loaf is raised by the elevator 5 the sheet of paper S resting on the bars 40$^c$ will be carried up by the loaf as it rises. To prevent the sheet S becoming improperly positioned sheet retainers 41 are provided just above the bars 40$^c$ and may be mounted on angle irons 41$^a$ connected to the outermost bars 40$^c$ as indicated in Figs. 25 and 26.

The loaf stop 41$^s$ may be attached to a plate 41$^t$ (see Figs. 25 and 26) and this loaf stop may be adjustable to suit different sizes of loaves. As shown a bolt 41$^u$ is passed through a slot in the upper arm 41$^v$ of the plate S and is fastened to plate 41$^t$ by a thumb screw 41$^w$.

What I claim is:

1. In mechanism of the character specified, loaf clamps adapted to engage opposite sides of the loaf when the latter is raised; a reciprocating slide carrying one of the said clamps; an oscillating lever on said slide carrying other of said clamps; a cam for actuating said oscillating lever at the proper time during its reciprocation by the slide; and an oscillating lever mounted on said slide and operated by the same cam, said oscillating lever carrying the final top end folding blades, substantially as described.

2. In mechanism of the character specified, loaf clamps adapted to engage opposite sides of a loaf, a reciprocating slide carrying one of the said clamps; an oscillating lever mounted on said slide carrying the other of said clamps, a cam for actuating said oscillating lever at the proper time during its reciprocation by the slide; and an oscillating lever mounted on said slide and operated by the same cam, said oscillating lever carrying folding blades.

3. In mechanism as described, loaf clamps adapted to engage opposite sides of the loaf; a reciprocating slide carrying one of the said clamps; an oscillating lever mounted on said slide and carrying other of said clamps, a stationary cam for actuating said oscillating lever at the proper time during its reciprocation by the slide; and an oscillating lever mounted on said slide and engaging the same cam, said oscillating lever carrying folding blades, substantially as described.

4. In a machine of the character specified, the combination of means for wrapping a loaf, a reciprocable slide, a pair of loaf holders adapted to engage opposite sides of the loaf, one of said loaf holders being adjustably attached to the inner end of the slide and the other of said loaf holders being adjustably attached to an arm pivotally attached to a bracket adjustably attached to a lever pivotally mounted upon said slide, and a stationary cam beside the slide and engaging the said pivoted lever to cause the latter to raise and lower the attached holder as the slide is reciprocated.

5. In combination with mechanism as set forth in claim 4; means whereby the holders may be adjusted toward or from each other to suit loaves of different widths; the loaf holders being pivotally supported and self adjusting, substantially as described.

6. In a machine of the character specified, the combination of a reciprocable slide, a lever pivotally mounted on said slide, a bracket attached to the free end of said lever, an arm pivoted on said bracket, a loaf holder pivotally connected to said arm, a spring connected to yieldingly position said arm, and a cam whereby the lever is raised and lowered at the proper times during the reciprocation of the slide.

7. In a machine of the character specified, the combination of a reciprocable slide, a loaf holder adjustably attached to one end thereof, a lever pivotally mounted on said slide, a bracket adjustably attached to the free end of said lever, an arm pivoted on said bracket, a second loaf holder pivotally connected to said arm, a spring connected to yieldingly position said arm, and a cam whereby the lever is raised and lowered at the proper times during the reciprocation of the slide.

8. In a machine of the character specified, the combination of a reciprocable slide, a lever pivotally mounted on said slide, a bracket attached to the free end of said lever, an arm pivoted on said bracket, a loaf holder pivotally connected to said arm, a spring connected to yieldingly position said arm, a stationary cam adjacent the slide, and an arm on said lever engaging said cam whereby the lever is raised and lowered at the proper times during the reciprocation of the slide.

9. In a machine of the character specified, the combination of a reciprocable slide, a loaf holder adjustably attached to one end thereof, a lever pivotally mounted on said slide, a bracket adjustably attached to the free end of said lever, an arm pivoted on said bracket, a second loaf holder pivotally connected to said arm, a spring connected to yieldingly position said arm, a stationary cam adjacent the slide, and an arm on said lever engaging said cam, whereby the lever is raised and lowered at the proper times during the reciprocation of the slide.

10. In mechanism of the character described, a reciprocable slide, levers mounted on said slide, blades connected with the free ends of said levers, and means for oscillating the levers as the slide is reciprocated, to cause the blades to form the final end fold.

11. In combination with mechanism as set forth in claim 10, a stationary cam adjacent the slide, and means on the levers engaging said cam whereby the blades are raised and lowered at the proper times as the slide is reciprocated.

12. In mechanism of the character specified, a reciprocable slide, levers mounted on said slide, blades connected with the free ends of said levers, means for oscillating the levers as the slide is reciprocated so as to form the final end fold as described during the movement of the loaf; and retaining plates at opposite sides of the path of the loaf adapted to retain the end folds in folded position when the slide is reciprocated.

13. In mechanism as set forth in claim 12, a stationary cam adjacent the slide, and means on the levers engaging said cam whereby the blades are raised and lowered at the proper times as the slide is reciprocated.

14. In mechanism of the character specified, the combination of a reciprocable slide, levers mounted on said slide; blades connected with the free ends of said levers adapted to form the final top end folds of the loaf as the slide reaches its innermost position; and retaining plates at opposite sides of the path of the loaf adapted to retain the end folds in folding position as the slide is reciprocated; a stationary cam adjacent the slide, and means on the levers engaging said cam whereby the blades are raised and lowered at the proper times as the slide is reciprocated.

15. In a machine of the character specified, having means for wrapping the loaves; end fold plates; and means on the plates adapted to crease the projecting unfolded ends of the wrapper on the line of fold preparatory to the folding thereof, substantially as described.

16. In a machine of the character specified, having means for wrapping the loaves; stationary end fold plates; and means on the plates adapted to crease the under side of the top end fold before the folding thereof.

17. In a machine of the character specified; having means for wrapping the loaves; end fold plates; and adjustable plates attached to the end fold plates and adapted to crease the inner or under side of the paper along the line of fold before the folding thereof.

18. In mechanism of the character specified; a paper feed roll, a shaft for actuating this roll, an oscillating member mounted on the shaft, clutch devices for engaging the oscillating member with the shaft when the member is moved in one direction, means for oscillating this member, and a trip mechanism controlled by the infeed of the loaves permitting the feed mechanism to operate once for each infed loaf.

19. In mechanism as set forth in claim 18, the trip devices comprising a rod pivotally connected with said member, a catch adapted to engage said rod to hold the member in raised position, a device adapted to be engaged by an incoming loaf, and connections between said device and catch whereby the latter is released by the loaf as it nears the wrapping position.

20. In combination with mechanism as set forth in claim 18, means for feeding the web, means for severing the sheet and means whereby the severing devices are operated after the proper length of web has been fed.

21. In combination with mechanism as set forth in claim 18, means for feeding the web, means for severing the sheet and means whereby the severing devices are operated after the proper length of web has been fed; the feeding and cutting devices being bodily adjustable longitudinally of the web to properly locate the sheets severed from the web, substantially as described.

22. In combination with mechanism as set forth in claim 18, means for severing the infed web comprising a pivotal support, and oppositely inclined knives mounted on said support whereby the web is severed simultaneously at two points and in opposite directions, and means for actuating the knives at the proper time.

23. In mechanism of the character specified, a paper feed roll, a shaft for actuating this roll, an oscillating member mounted on the shaft, clutch devices for engaging the oscillating member with the shaft when the member is moved in one direction, a rod adjustably connected with said member and having a slotted lower end, a crank pin engaging said slot, and trip devices controlled by the infeed of the loaves, permitting the feed mechanism to operate once for each infed loaf.

24. In mechanism as set forth in claim 23, said trip devices comprising a gravital rod pivotally connected with said member, a gravital catch adapted to engage said rod to hold the member in raised position, a trip device adapted to be engaged by an incoming loaf, and connections between said trip device and latch whereby the latter is released by the loaf as it nears the wrapping position.

25. In a machine of the character specified, a delivery trough comprising opposite side members each composed of a series of parallel bars; a conveyor belt in the bottom of said trough, means for adjusting the side members toward or from each other, and means for yieldingly holding the side members in adjusted position, substantially as described.

26. In loaf wrapping mechanism, loaf clamps adapted to engage opposite sides of the loaf; a reciprocating slide carrying one of the said clamps; a lever on said slide carrying other of said clamps; a cam for actuating said lever at the proper time during its reciprocation by the slide; and an oscillating lever also mounted on said slide and operated by the same cam, said oscillating lever carrying the final top end folding blades, substantially as described.

27. In a machine of the character specified, the combination of a reciprocable slide, a lever pivoted to said slide, a loaf holder carried by said lever, a second lever pivotally mounted on said slide, a tucker blade carried by said second lever; and cam means adapted to operate both levers during the reciprocation of the slide at the proper time to raise and lower the loaf holder and raise and lower the tucker blade.

28. In combination with devices as set forth in claim 27, a second loaf holder attached to the slide to cooperate with the first holder to hold the loaf, and adapted to forward the loaf as the slide is reciprocated.

29. In a machine of the character specified, the combination of a reciprocable slide, a lever pivoted to said slide, a loaf holder carried by said lever; a second lever pivotally mounted on said slide, a tucker blade carried by said second lever; a stationary cam beside the slide, and means on each lever engaging said cam; whereby as the slide is reciprocated each lever is operated at the proper time to raise and lower the holder and raise and lower the tucker, substantially as described.

30. In combination with devices as set forth in claim 29, a second loaf holder attached to the slide cooperating with the first holder to hold the loaf, and also acting as a pusher to forward the loaf as the slide is reciprocated.

31. In mechanism as set forth in claim 18, the trip devices comprising a rod pivotally connected with said member, a catch adapted to engage said rod to hold the member in raised position, an adjustable device adapted to be engaged by an incoming loaf, and connections between said device and catch whereby the latter is released by the loaf actuating said device, as the loaf is fed toward wrapping position.

32. In combination with mechanism as set forth in claim 23, spring means whereby the oscillating member is moved to cause instantaneous disengagement of the clutch devices when said member is permitted to move in clutch disengaging direction.

33. In mechanism of the character specified, a paper feed roll; a shaft for actuating said roll; an oscillating member mounted on the shaft; clutch devices engaging the oscillating member with the shaft when the member is moved in one direction; a rod connected with said member and having a slotted lower end; a crank pin engaging said slot; a gravital rod pivotally connected with said member, a gravital catch adapted to engage said rod to hold the member in raised position, a trip device adapted to be engaged by an incoming loaf, and connections between said trip device and catch whereby the latter is released by the loaf as it nears the wrapping position.

34. In mechanism of the character specified, a paper feed roll; a shaft for actuating said roll; an oscillating member mounted on the shaft; clutch devices for engaging the oscillating member with the shaft when the member is moved in one direction; said oscillating member having a slot; a block adjustable in said slot; a rod connected with said block and having a slotted lower end; a crank pin engaging said slot; a gravital rod pivotally connected with said member, a gravital catch adapted to engage said rod to hold the member in raised position, a trip device adapted to be engaged by an incoming loaf, and connections between said trip device and catch whereby the latter is released by the loaf as it nears the wrapping position.

35. In mechanism of the character specified having means for feeding loaves, means for raising the loaf to wrapping position, and means for wrapping the loaf; a spring compressor bar adapted to contact with the top of the loaf as the latter is raised to wrapping position, and retain the wrapper in position on the loaf during the initial wrapping operation; said spring compressor being vertically adjustable.

36. In a machine of the character specified, the combination of a reciprocable slide, a lever pivotally mounted on said slide and having a long arm and a short arm, a loaf holder pivotally connected to the long arm of said lever; and a spring interposed between the short arm of said lever and an abutment on the slide, whereby said lever is caused to hold the loaf holder with uniform pressure against the loaves of varying sizes.

37. In a machine of the character specified, the combination of a reciprocable slide, a lever pivotally mounted on said slide, an arm pivoted on the free end of said lever and having a lug extending above its pivot; a loaf holder pivotally connected to said arm; a spring interposed between said lug and a stud on the lever, to yieldingly position said arm, and cause it to press the loaf holder with substantially uniform pressure against loaves varying in size.

38. In combination with mechanism as set forth in claim 37, a stationary cam adjacent the slide, and an arm on said lever engaging said cam whereby the lever is raised and lowered at the proper times during the reciprocation of the slide.

39. In combination with mechanism as set forth in claim 23, means for severing the paper web comprising a cutter-bar, knives arranged end to end at acute angles to the bar in both vertical and horizontal planes, and at obtuse angles to each other; and adapted to simultaneously operate on different portions of the web and make a shear cut.

40. In combination with mechanism as set forth in claim 23, means for severing the paper web, comprising a cutter-bar, a pivoted support beside the bar, knives connected to said support and arranged at acute angles to the support and to the bar and at obtuse angles to each other, and means for actuating the knives at the proper time whereby the web is severed by shear cuts simultaneously at two points and in opposite directions.

41. In apparatus of the character specified, means for elevating loaves to be wrapped, loaf guides opposite said means, brackets supporting these guides, and rods having oppositely threaded portions engaging the opposite brackets; whereby upon turning the rods the guides may be adjusted toward or from each other.

42. In apparatus of the character specified, having means for elevating the loaves to be wrapped, guides for positioning a loaf during the elevating thereof, brackets supporting these guides, and rotatable shafts upon which the brackets are mounted, said shafts having oppositely threaded portions engaging the opposite guides; whereby when the shafts are rotated the guides may be simultaneously moved toward or from each other.

43. In a machine for wrapping loaves the combination of mechanism for feeding loaves to wrapping position; and mechanism for wrapping the loaves while in wrapping position; with means for supplying paper to the wrapping devices comprising a paper feed roll, a reciprocatory rod; devices operatively engaging the rod with the roll when the member is moved in one direction, and trip devices permitting the feed mechanism to operate once for each infed loaf.

44. In mechanism as set forth in claim 43, said trip devices comprising a gravital rod pivotally connected with said member, a gravital catch adapted to engage said rod to hold the member in raised position, a trip device adapted to be engaged by an incoming loaf, and connections between said trip devices and latch whereby the latter is released by the loaf as it nears the wrapping position.

45. In a machine for wrapping loaves, the combination of mechanism for feeding loaves to wrapping position; mechanism for wrapping the loaves while in wrapping position; with means for supplying paper to the wrapping devices comprising a paper feed roll, an oscillating member mounted on the roll shaft, devices engaging the oscillating member with the shaft when the member is moved in one direction, a rod connected with said member and having a slotted lower end, a crank pin engaging said slot, and trip devices permitting the feed mechanism to operate once for each infed loaf.

46. In mechanism as set forth in claim 45, said trip devices comprising a gravital rod pivotally connected with said member, a gravital catch adapted to engage said rod to hold the member in raised position, a trip device adapted to be engaged by an incoming loaf, and connections between said trip devices and latch whereby the latter is released by the loaf as it nears the wrapping position.

47. In a structure of the class described, the combination with a way, of a blade-like end flap folder disposed at the side of the way, a blade-like creasing finger adjustably mounted on said end flap folder, and a second flap folder disposed at the rear of said end flap folder in operative relation to said creasing finger.

48. In a structure of the class described, the combination with a way, of an end flap folder disposed at the side of the way, an adjustable creasing finger operatively associated with said end flap folder, and a second flap folder operatively associated with said creasing finger to fold the creased flap.

49. In a structure of the class described, the combination with a way, a blade-like end flap folder, a blade-like creasing finger adjustably mounted on said end flap folder, and a top flap folder disposed at the rear of said end flap folder and operatively associated with said creasing finger.

In testimony that I claim the foregoing as my own, I affix my signature.

HENRY F. BECHMAN.